United States Patent
Yan et al.

(10) Patent No.: US 11,361,495 B1
(45) Date of Patent: Jun. 14, 2022

(54) SYSTEM AND METHOD FOR TEXTURE MAPPING BASED ON GUIDANCE PRIOR

(71) Applicants: Beijing Wodong Tianjun Information Technology Co., Ltd., Beijing (CN); JD.com American Technologies Corporation, Mountain View, CA (US)

(72) Inventors: Qingan Yan, San Jose, CA (US); Feng Du, Beijing (CN); Fusheng Guo, Beijing (CN); Xiangjun Liu, Beijing (CN); Hui Zhou, Sunnyvale, CA (US)

(73) Assignees: BEIJING WODONG TIANJUN INFORMATION TECHNOLOGY CO., LTD., Beijing (CN); JD.COM AMERICAN TECHNOLOGIES CORPORATION, Mountain View, CA (US)

( * ) Notice: Subject to any disclaimer, the term of this patent is extended or adjusted under 35 U.S.C. 154(b) by 0 days.

(21) Appl. No.: 17/159,300

(22) Filed: Jan. 27, 2021

(51) Int. Cl.
*G09G 5/00* (2006.01)
*G06T 15/04* (2011.01)

(52) U.S. Cl.
CPC .................... *G06T 15/04* (2013.01)

(58) Field of Classification Search
CPC ....... G06T 7/579; G06T 17/00; G06T 17/205; G06T 2207/10016; G06T 2207/20221; G06T 2207/30244; G06T 11/001; G06T 15/04; G06T 15/205; G06T 2200/04; G06T 2200/08; H04N 13/111; H04N 5/23238
See application file for complete search history.

(56) References Cited

U.S. PATENT DOCUMENTS

2020/0349754 A1* 11/2020 Michielin ............... G06T 15/04

OTHER PUBLICATIONS

Qian-Yi Zhou, and Vladlen Koltun, Color map optimization for 3D reconstruction with consumer depth cameras, ACM Transactions on Graphics, 2014, 33(4), 15: 1-10.

Michael Waechter, Nils Moehrle, and Michael Goesele, Let there be color! Large-scale texturing of 3D reconstructions, ECCV, 2014, 836-850.

Yanping Fu, Qingan Yan, Long Yang, Jie Liao, and Chunxia Xiao, Texture mapping for 3D reconstruction with RGB-D sensor, Proceedings of the IEEE Conference on Computer Vision and Pattern Recognition (CVPR), 2018, 4645-4653.

(Continued)

*Primary Examiner* — Hau H Nguyen
(74) *Attorney, Agent, or Firm* — Scully, Scott, Murphy & Presser, P.C.

(57) ABSTRACT

A system for three dimensional (3D) model texturing. The system includes a computing device configured to: instruct a camera to capture images of an object; construct a 3D model of the object based on the images; texture the 3D model using keyframes of the images to obtain a textured 3D model; generate guidance images by projecting the textured 3D model to camera poses of the keyframes; for each guidance image and keyframe pair: modify the guidance image and the keyframe based on their correspondence to obtain enhanced guidance image and warped image, combine the enhanced guidance image and the warped image to obtain harmonized image, and project color from the harmonized images to the 3D model to obtain textured 3D model.

20 Claims, 11 Drawing Sheets

(56) References Cited

OTHER PUBLICATIONS

Yanping Fu, Qingan Yan, Jie Liao, and Chunxia Xiao, Joint texture and geometry optimization for RGB-D reconstruction, Proceedings of the IEEE/CVF Conference on Computer Vision and Pattern Recognition (CVPR), 2020, 5950-5959.

Sai Bi, Nima Khademi Kalantari, and Ravi Ramamoorthi, Patch-based optimization for image-based texture mapping, ACM Transactions on Graphics, 2017, 36(4), 106: 1-11.

Michal Irani, and Shmuel Peleg, Improving resolution by image registration, CVGIP: Graphical Models and Image Processing, 1991, 53(3): 231-239.

Richard A Newcombe, Shahram Izadi, Otmar Hilliges, et al., KinectFusion: real-time dense surface mapping and tracking, 10th IEEE International Symposium on Mixed and Augmented Reality (ISMAR), 2011, 127-136.

YiChang Shih, Sylvain Paris, Connelly Barnes, William T. Freeman, and Fredo Durand, Style transfer for headshot portraits, ACM Transactions on Graphics, 2014, 33(4), 148: 1-14.

* cited by examiner

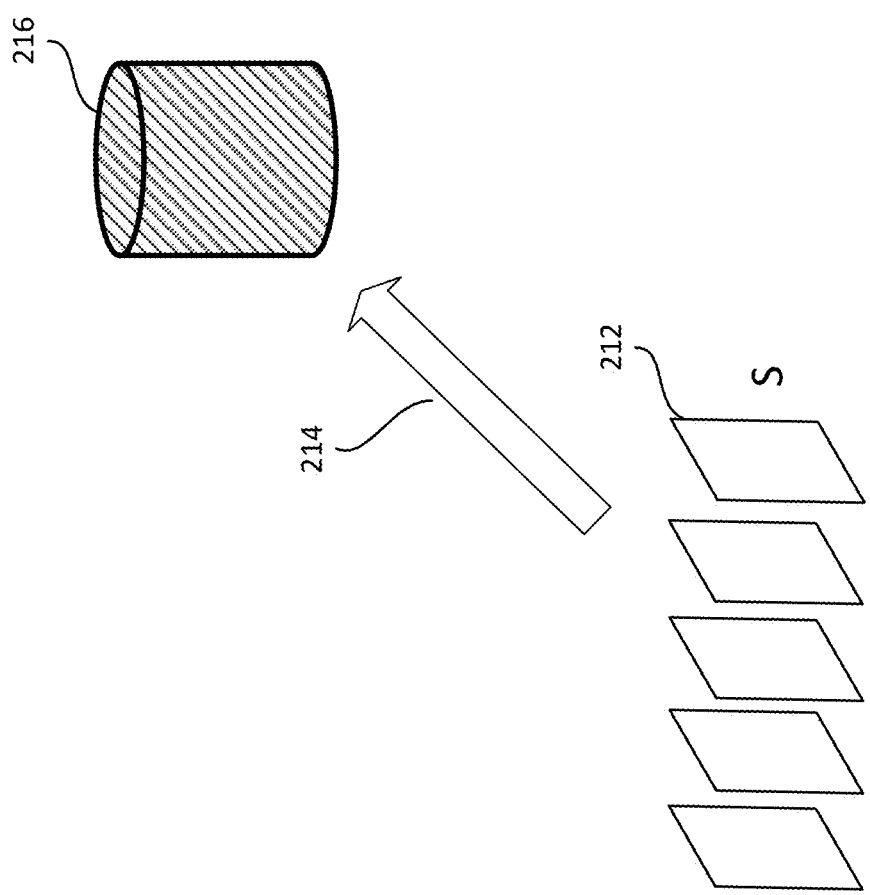

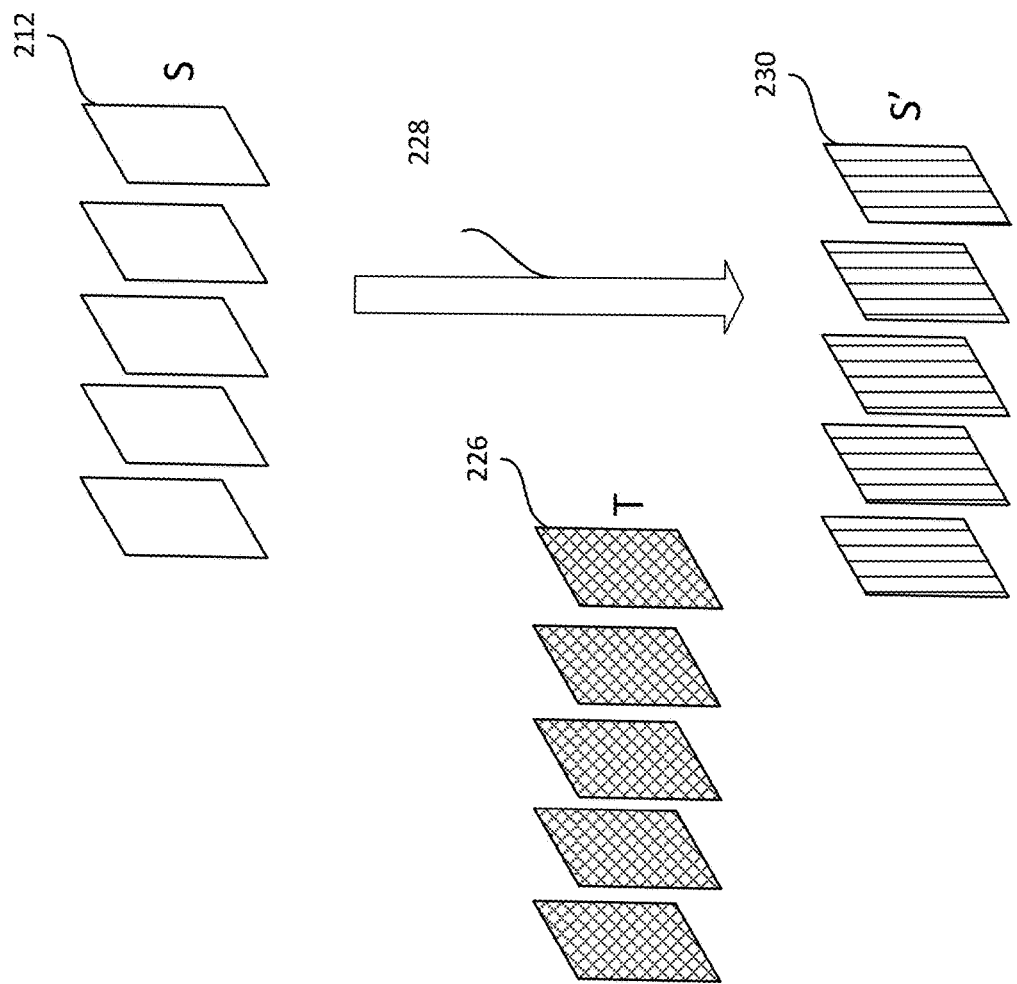

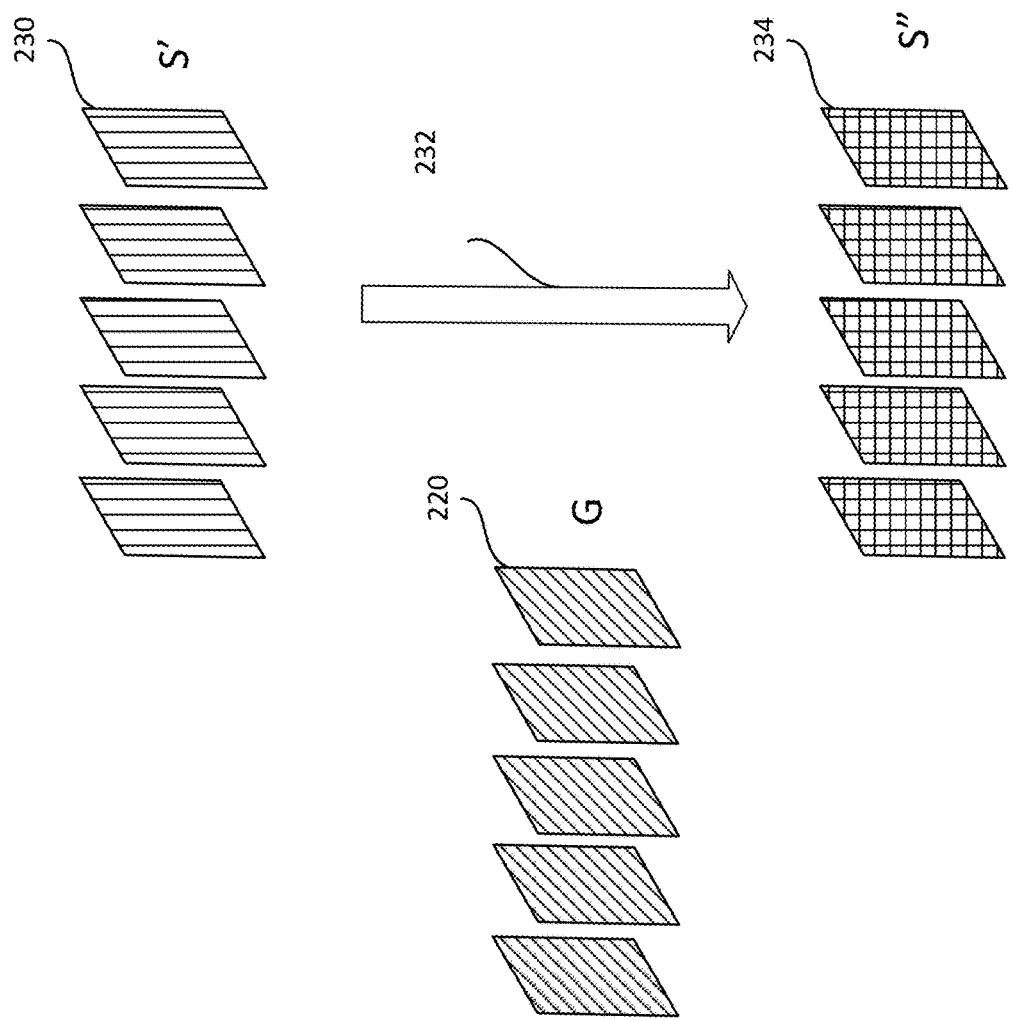

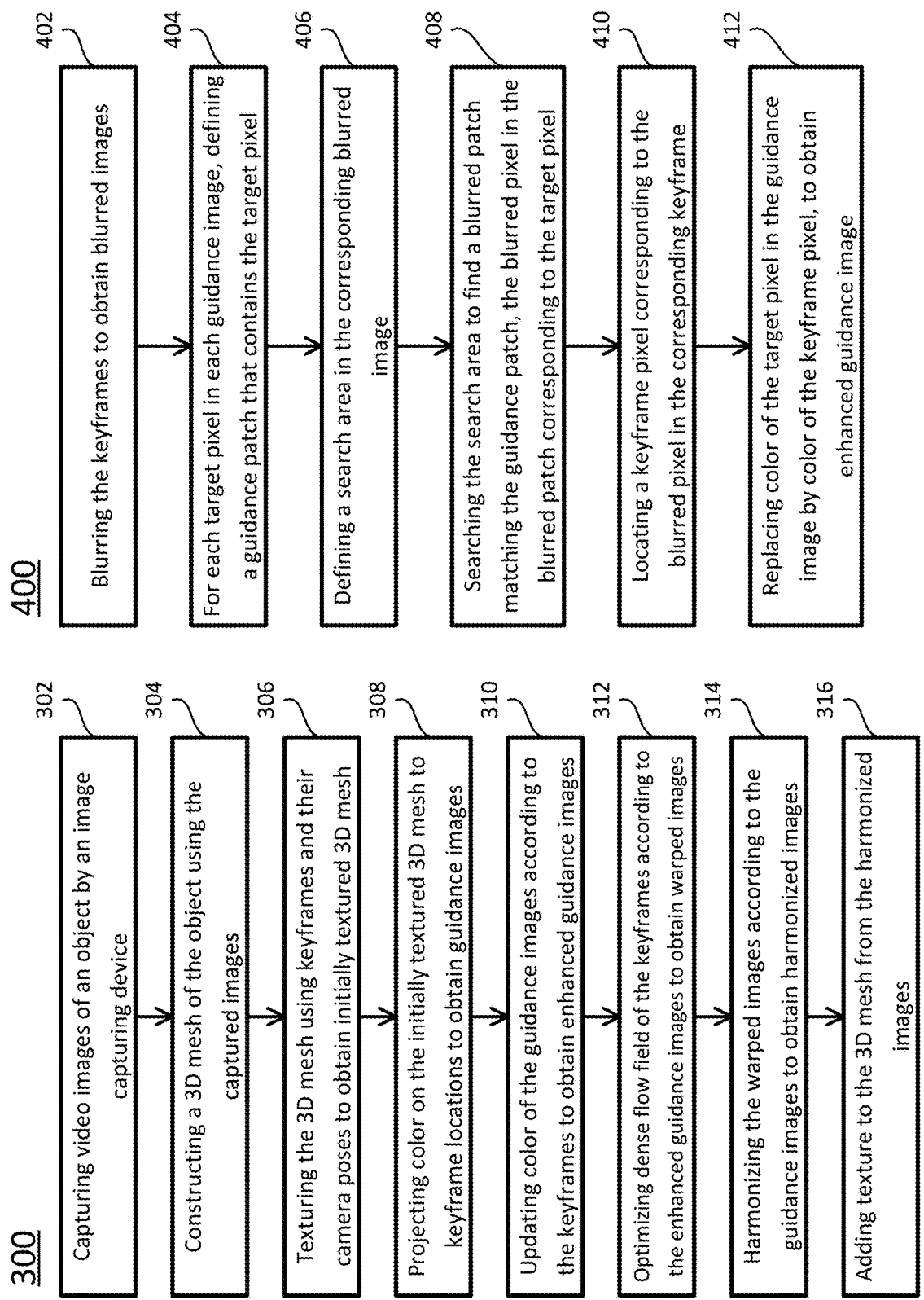

SYSTEM AND METHOD FOR TEXTURE MAPPING BASED ON GUIDANCE PRIOR

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to three dimensional (3D) reconstruction in computer vision, and more particularly to systems and methods for texturing or rendering reconstructed 3D models efficiently using guidance images.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

3D reconstruction is an important and challenging project in the field of computer vision. It offers the capability of automatically acquiring virtual geometries from sequences of images, and has been widely used in industry, for example, computer-aided design (CAD) modeling for 3D printing, navigation for robotics, and street understanding for autonomous driving. Especially, with the development of consumer depth cameras in portable mobile devices, billions of people can now create 3D geometric models of their desired real-world objects and scenes easily.

More specifically, in retail business, obtaining high-fidelity 3D information has great benefit for augmenting shopping experience and inbound marketing. It can provide a more entertaining way to virtually exhibit goods in 3D manner and even enable the customers to virtually try-on or decorate them in real environment.

However, only capturing a raw geometry of an object is insufficient for real applications, as color information showing the object's appearance is still missing from the geometry. A visually faithful reconstruction should incorporate both the geometry and apparent color of every point on the object. To some extent, appearance plays an even more important role in this problem because a good texture can mitigate artifact within geometric models. Generating a texture for every reconstructed model manually by graphics artists is not only inefficient but also costly. To texture reconstructed 3D geometries automatically, existing systems either suffer from blurring, ghosting or require expensive computational devices due to complicate global optimization iterations, which significantly limits the applicable scope in reality, in particular on mobile devices.

Therefore, an unaddressed need exists in the art to address the aforementioned deficiencies and inadequacies.

SUMMARY

In certain aspects, the present disclosure relates to a system for three dimensional (3D) model texturing. The system includes a computing device and an image capturing device in communication with the computing device. The computing device has a processor and a storage device storing computer executable code. The computer executable code, when executed at the processor, is configured to:

instruct the image capturing device to capture a plurality of images of an object, where the plurality of images comprises m number of keyframes, and m is a positive integer;

construct a 3D model of the object based on the plurality of images, and define camera poses of the m number of keyframes;

initially texture the 3D model using the m number of keyframes to obtain an initially textured 3D model;

generate each of m number of guidance images by projecting the initially textured 3D model to the camera pose of corresponding one of the m number of keyframes; and for an i-th guidance image of them number of guidance images and an i-th keyframe of the m number of keyframes: modify the i-th guidance image and the i-th keyframe based on their correspondence to obtain i-th warped image, combine the i-th guidance image and the i-th warped image to obtain i-th harmonized image, and project color from the i-th harmonized image to the 3D model to obtain textured 3D model.

In certain embodiments, the combination is performed by adding low frequency components of the i-th guidance image with high frequency components of the i-th warped image.

The camera poses means poses of the image capturing device. In certain embodiments, the image capturing device is a red-green-blue (RGB) camera or a RGB-depth (RGBD) camera.

In certain embodiments, the computer executable code is configured to construct the 3D model using KinectFusion.

In certain embodiments, the computer executable code is configured to initially texture the 3D model using a blending-based technique.

In certain embodiments, the computer executable code is configured to modify the i-th guidance image and the i-th keyframe by: searching a pixel in the i-th keyframe for each pixel in the i-th guidance image, and replacing color of the each pixel in the i-th guidance image with color of corresponding one of the pixels in the i-th keyframe to obtain i-th enhanced guidance image; and optimizing dense flow field of the i-th keyframe based on the i-th enhanced guidance image to obtain the i-th warped image.

In certain embodiments, the computer executable code is configured to combine the i-th guidance image and the i-th warped image by: performing Laplacian pyramid respectively on the i-th guidance image and the i-th warped image to obtain a six-level i-th guidance pyramid and a six-level i-th keyframe pyramid, and replacing sixth level of the i-th keyframe pyramid with sixth level of the i-th guidance pyramid to obtain the i-th harmonized image.

In certain embodiments, the step of searching a pixel in the i-th keyframe is performed by:

blurring the i-th keyframe to obtain an i-th blurred image; and for each target pixel in the i-th guidance image: defining a guidance patch in the i-th guidance image surrounding the target pixel; searching a blurred patch in the i-th blurred image that best matches the guidance patch, the blurred patch surrounding a blurred pixel; and defining a keyframe pixel, wherein coordinates of the keyframe pixel in the i-th keyframe are the same as coordinates of the blurred pixel in the i-th blurred image, and color of the keyframe pixel is used to replace color of the target pixel in the i-th guidance image to obtain the i-th enhanced guidance image.

In certain embodiments, size of the targe patch is in a range of 3×3 pixels to 5×5 pixels. In certain embodiments, the size of the targe patch is 3×3 pixels. In certain embodiments, the size of the targe patch is 5×5 pixels.

In certain embodiments, the step of searching is performed in a search area in the i-th blurred image, size of the search area is in a range of (20-100)×(20-100) pixels, the search area has a central pixel, coordinates of the central pixel in the i-th blurred image are the same as the coordinates of the target pixel in the i-th guidance image.

In certain embodiments, the size of the search area is 50×50 pixels.

In certain embodiments, the computer executable code is configured to project color from the i-th harmonized image to the 3D model to obtain textured 3D model by, for each triangle face of the 3D model:

determining a number of harmonized keyframes comprising an area corresponding to the triangle face;

determining a normal line of the triangle face passing through a central point of the triangle face;

for each of the number of harmonized keyframes: connecting the central point of the triangle face and camera center corresponding to the harmonized keyframe to obtain a connecting line; calculating a direction score $z_1$ by $$z_1 = \frac{90 - \alpha}{90},$$

wherein $\alpha$ is an acute angle between the normal line and the connecting line; calculating a distance score based on closest distance d between the area and boundaries in the harmonized keyframe, wherein the distance score is 1 when the closest distance is greater than a pixel threshold Th, and the distance score is $$z_2 = \frac{d}{Th}$$

when the closest distance d equals to or is less than the pixel threshold; and calculating an overall score by weighted summation of the direction score and the distance score; and texturing the triangle face using the one of the number of harmonized keyframes that has the highest overall score.

In certain embodiments, the pixel threshold is 50, and the overall score z is calculated by: $z=0.6 \times z_2+0.4 \times z_2$. In certain embodiments, the overall score z is calculated by: $z=0.5 \times z_2+0.5 \times z_2$.

In certain embodiments, the system further includes:

a server computing device in communication with the computing device, and configured to store the textured 3D model; and a remote computing device in communication with the server computing device, and configured to, upon receiving an instruction from a customer to fit a product having the textured 3D model: retrieve the textured 3D model, and fit the textured 3D model to the customer at real time.

In certain aspects, the present disclosure relates to a method for three dimensional (3D) model texturing. In certain embodiments, the method includes:

capturing, by an image capturing device, a plurality of images of an object, and sending the captured plurality of images to a computing device, where the plurality of images comprises m number of keyframes, and m is a positive integer;

constructing, by the computing device, a 3D model of the object based on the plurality of images, and defining camera poses of the m number of keyframes;

initially texturing, by the computing device, the 3D model using the m number of keyframes to obtain an initially textured 3D model;

generating, by the computing device, each of m number of guidance images by projecting the initially textured 3D model to the camera pose of corresponding one of the m number of keyframes; and for an i-th guidance image of them number of guidance images and an i-th keyframe of the m number of keyframes: modifying the i-th guidance image and the i-th keyframe based on their correspondence to obtain i-th warped image, combining the i-th guidance image and the i-th warped image to obtain i-th harmonized image, and projecting color from the i-th harmonized image to the 3D model to obtain textured 3D model.

In certain embodiments, the step of constructing the 3D model is performed using KinectFusion, and the step of initially texturing the 3D model is performed using a blending-based technique.

In certain embodiments, the step of modifying the i-th guidance image and the i-th keyframe and the step of combining the i-th guidance image and the i-th warped image comprise:

searching a pixel in the i-th keyframe for each pixel in the i-th guidance image, and replacing color of the each pixel in the i-th guidance image with color of corresponding one of the pixels in the i-th keyframe to obtain i-th enhanced guidance image;

optimizing dense flow field of the i-th keyframe based on the i-th enhanced guidance image to obtain the i-th warped image; and performing, by the computing device, Laplacian pyramid respectively on the i-th guidance image and the i-th warped image to obtain a six-level i-th guidance pyramid and a six-level i-th keyframe pyramid, and replacing sixth level of the i-th keyframe pyramid with sixth level of the i-th guidance pyramid to obtain the i-th harmonized image.

In certain embodiments, the step of searching a pixel in the i-th keyframe includes:

blurring the i-th keyframe to obtain an i-th blurred image; and for each target pixel in the i-th guidance image: defining a guidance patch in the i-th guidance image surrounding the target pixel; searching a blurred patch in the i-th blurred image that best matches the guidance patch, the blurred patch surrounding a blurred pixel; and defining a keyframe pixel, wherein coordinates of the keyframe pixel in the i-th keyframe are the same as coordinates of the blurred pixel in the i-th blurred image, and color of the keyframe pixel is used to replace color of the target pixel in the i-th guidance image to obtain the i-th enhanced guidance image.

In certain embodiments, size of the targe patch is in a range of 3×3 pixels to 5×5 pixels, and the step of searching is performed in a search area in the i-th blurred image, size of the search area is in a range of (20-100)×(20-100) pixels, the search area has a central pixel, coordinates of the central pixel in the i-th blurred image are the same as the coordinates of the target pixel in the i-th guidance image.

In certain embodiments, the step of projecting color from the i-th harmonized image to the 3D model to obtain textured 3D model includes, for each triangle face of the 3D model:

determining a number of harmonized keyframes comprising an area corresponding to the triangle face;

determining a normal line of the triangle face passing through a central point of the triangle face;

for each of the number of harmonized keyframes: connecting the central point of the triangle face and camera center corresponding to the harmonized keyframe to obtain a connecting line; calculating a direction score $z_1$ by $$z_1 = \frac{90 - \alpha}{90},$$

wherein $\alpha$ is an acute angle between the normal line and the connecting line; calculating a distance score based on closest distance d between the area and boundaries in the harmonized keyframe, wherein the distance score is 1 when the closest distance is greater than a pixel threshold Th, and the distance score is $$z_2 = \frac{d}{Th}$$

when the closest distance a equals to or is less than the pixel threshold; and calculating an overall score by weighted summation of the direction score and the distance score; and texturing the triangle face using the one of the number of harmonized keyframes that has the highest overall score.

In certain embodiments, the pixel threshold is 50, and the overall score z is calculated by: $z=0.6 \times z_2 + 0.4 \times z_2$. In certain embodiments, the overall score z is calculated by: $z=0.5 \times z_2 + 0.5 \times z_2$.

In certain embodiments, the method further includes:

storing the textured 3D model to a server computing device in communication with the computing device; and upon receiving an instruction from a customer, at a remote computing device in communication with the server computing device, to fit a product having the textured 3D model: retrieving the textured 3D model, and fitting the textured 3D model to the customer at real time.

In certain aspects, the present disclosure relates to a non-transitory computer readable medium storing computer executable code. The computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIG. 2C schematically depicts an initial texturing process according to certain embodiments of the present disclosure.

FIG. 2F schematically depicts a dense flow warping process according to certain embodiments of the present disclosure.

FIG. 2G schematically depicts a light harmonization process according to certain embodiments of the present disclosure.

FIG. 3 schematically depicts a method for 3D mesh construction and texture mapping according to certain embodiments of the present disclosure.

FIG. 4 schematically depicts a method for generating enhanced guidance images from guidance images according to certain embodiments of the present disclosure.

DETAILED DESCRIPTION

Figure 1:
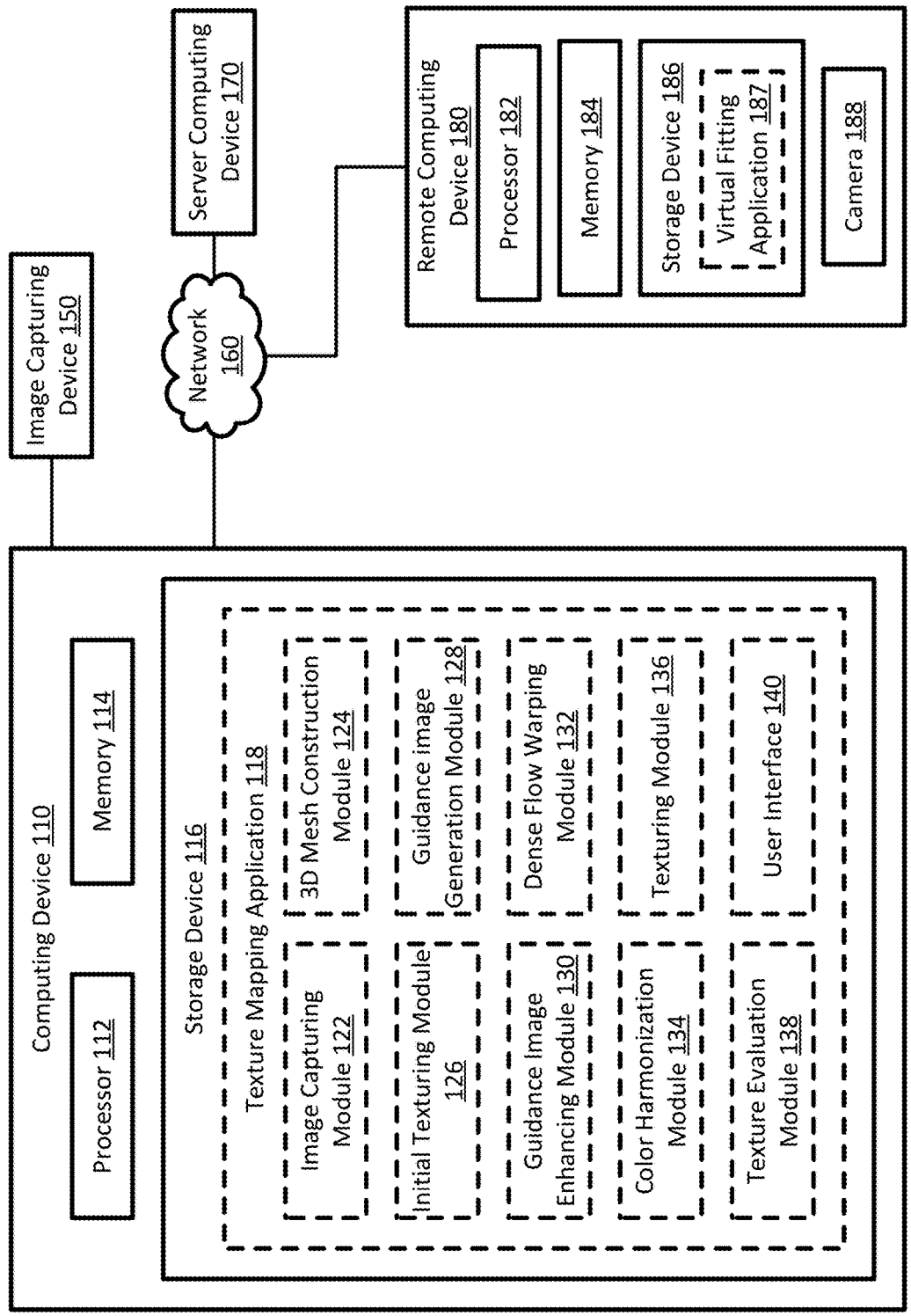
FIG. 1 schematically depicts a texture mapping system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. As used herein, "plurality" means two or more. As used herein, the terms "comprising", "including", "carrying", "having", "containing", "involving", and the like are to be understood to be open-ended, i.e., to mean including but not limited to.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof. The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

As described above, the texturing of reconstructed 3D geometries in the art have undesired results. There are several reasons that lead to the undesired texturing results. First, the calculated camera poses from a 3D reconstruction pipeline are not always accurate. Generally, there are lots of parameters that need to be optimized in the 3D reconstruction process. It is impossible to guarantee that every step is perfect. Any deviation in one parameter or noise in geometries would consequently affect the following progress. While performing several pose optimizations upon entire viewpoints can somewhat mitigate the residual, it is insufficient to represent local pixel-wise movements solely through projection matrix from a global image-wise perspective. Second, there is potential luminance inconsistency among different viewpoints. In reality, due to the occlusion and reflection, the captured photos may vary in light condition. So, synthesizing the captured photos directly is easy to raise the instability in texture mapping results. The third one is the discrepancy between the reconstructed model and the real object. Because of the existence of noises, the acquired 3D geometric model usually is not precisely the same as the real one in the picture. This inconsistency is extremely common at the boundary of each image where different surfaces of the object are observed. Therefore, it is easy to reproject undesired colors around these regions onto the 3D geometry.

In certain aspects, the present disclosure provides a system that gets clear and consistent textured 3D shapes via common mobile devices, while keeping a relatively low cost on calculation and hardware requirement. In certain embodiments, the following technical problems are resolved.

First, image guided keyframe correction. In order to overcome the blurring artifact in blending-based texture mapping methods, face-based texture mapping technique makes the texture of each face from a single viewpoint. However, noisy camera pose information is an inevitable issue in 3D reconstruction. It produces undesired errors to both geometry estimation and texture projection. Directly mapping these images onto the geometric model would suffer from visual misalignment at the seam of view changes. This step is to locally warp the pixels within source keyframes into desired positions, which is able to mitigate the visual conflict of neighboring textures at label seams, with the guidance of additionally rendered images under these viewpoints.

Second, style-based color harmonization. In reality, the captured photos usually contain different intensity distribution, which means the same object may have multiple observed colors. This reduces the stability of current reconstruction systems. Hence, this step is to synchronize the light condition of each corrected keyframe and make them converge towards the guidance image, so that it ensures that the illuminance of textured 3D faces from different keyframes is consistent.

Third, boundary-aware view selection. While the keyframe correction step mitigates the texture drifting at seams, some misprojections would still occur due to the inconsistent shape between the reconstructed geometry and the captured images. Selecting image textures around observed surface boundaries contributes a higher risk for the misprojection problem. This step incorporates the edge cue in depth images to penalize the contribution from these regions and pay more attention to the center part.

FIG. 1 schematically depicts a texture mapping system according to certain embodiments of the present disclosure. As shown in FIG. 1, the system 100 includes a computing device 110, an image capturing device 150, a server computing device 170, and one or more remote computing devices 180. In certain embodiments, the computing device 110 may be a cluster, a cloud computer, a general-purpose computer, or a specialized computer that constructs 3D models and textures the 3D models. In certain embodiments, the computing device 110 is a specialized computer, such as an IPAD.

The image capturing device 150 is in communication with the computing device 110. In certain embodiments, the communication is performed via a network, which may be a wired or wireless network, and may be of various forms, such as a public network and a private network, or via non-transitory computer media including but not limited to flash drive, USB drives, hard drive, floppy disk, SD card, optical drive, or any other portable data storage media. In certain embodiments, the mage capturing device 150 is preferably directed connected to the computing device 110 via, for example, a USB connection, a lighting port, or a special mount. The image capturing device 150 is configured to capture images or video frames of an object. The image capturing device 150 may be, for example, a video camera, a gray scale camera, a red-green-blue (RGB) camera, a RGB-depth (RGBD) camera, or a combination thereof. In certain embodiments, the image capturing device 150 is the RGB camera, which is sufficient for the 3D model construction and texture mapping function of the present disclosure. In certain embodiments, the image capturing device 150 is the RGBD camera, which can use the depth information in addition to the RGB images. In certain embodiments, the image capturing device 150 is a structure sensor, which can be used to scan the object with both RGB information and depth information. When the computing device 110 is the IPAD and the image capturing device 150 is a structure sensor directly attached to the IPAD, the combination of the IPAD 110 and the structure sensor 150 is portable and is suitable for scanning the object.

The server computing device 170 and the remote computing devices 180 are in communication with the computing device 110, for example, via a network 160. In certain embodiments, the network 160 may be a wired or wireless network, and may be of various forms. Examples of the networks may include, but is not limited to, a local area network (LAN), a wide area network (WAN) including the Internet, or any other type of networks. The best-known computer network is the Internet. In certain embodiments, the network 160 may be an interface such as a system interface or a USB interface other than a network, or any other types of interfaces to communicatively connect the computing device 110.

The server computing device 170 may be a server of an e-commerce platform, which is configured to store the textured 3D models and provide service for virtual fitting. The server computing device 170 may further provide an ordering system, functions to fulfil an order placed by a customer.

The remote computing devices 180 may be terminals of the customers, such as a handhold pad or a mobile device. A customer may install a fitting application of the e-commerce platform on the remote computing device 180, and use the application to virtually try on a product when the 3D product model is available from the server computing device 170. For example, when the customer reviews a pair of shoes from the e-commerce platform and the 3D model of the pair of shoes are available from the server computing device 170, the customer can virtually try on the shoes via the application, using the 3D model of the pair of shoes. When the customer reviews a coffee maker or stuffed toys from the e-commerce platform and the 3D models of the coffee maker or stuffed toys are available, the customer can virtually view the coffee maker stuffed toys from different view angles.

As shown in FIG. 1, the computing device 110 may include, without being limited to, a processor 112, a memory 114, and a storage device 116. In certain embodiments, the computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices. The processor 112 may be a central processing unit (CPU) which is configured to control operation of the computing device 110. The processor 112 can execute an operating system (OS) or other applications of the computing device 110. In some embodiments, the computing device 110 may have more than one CPU as the processor, such as two CPUs, four CPUs, eight CPUs, or any suitable number of CPUs. The memory 114 can be a volatile memory, such as the random-access memory (RAM), for storing the data and information during the operation of the computing device 110. In certain embodiments, the memory 114 may be a volatile memory array. In certain embodiments, the computing device 110 may run on more than one memory 114. The storage device 116 is a non-volatile data storage media for storing the OS (not shown) and other applications of the computing device 110. Examples of the storage device 116 may include non-volatile memory such as flash memory, memory cards, USB drives, hard drives, floppy disks, optical drives, solid-state drive (SSD) or any other types of data storage devices. In certain embodiments, the storage device 116 may be a local storage, a remote storage, or a cloud storage. In certain embodiments, the computing device 110 may have multiple storage devices 116, which may be identical storage devices or different types of storage devices, and the applications of the computing device 110 may be stored in one or more of the storage devices 116 of the computing device 110. In certain embodiments, the computing device 110 is a cloud computer, and the processor 112, the memory 114 and the storage device 116 are shared resources provided over the Internet on-demand.

As shown in FIG. 1, the storage device 116 includes a texture mapping application 118. The texture mapping application 118 is configured to construct 3D models of an object and texture the 3D models. The texture mapping application 118 includes, among other things, an image capturing module 122, a 3D mesh construction module 124, an initial texturing module 126, a guidance image generation module 128, a guidance image enhancing module 130, a dense flow warping module 132, a color harmonization module 134, a texturing module (or a view selection) module 136, and optionally a texture evaluation module 138 and a user interface 140. In certain embodiments, the texture mapping application 118 may include other applications or modules necessary for its operation. It should be noted that the modules are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code. In certain embodiments, some or all of the modules of the virtual fitting application 118 may be located at a remote computing device or distributed in a cloud.

Figure 2A:
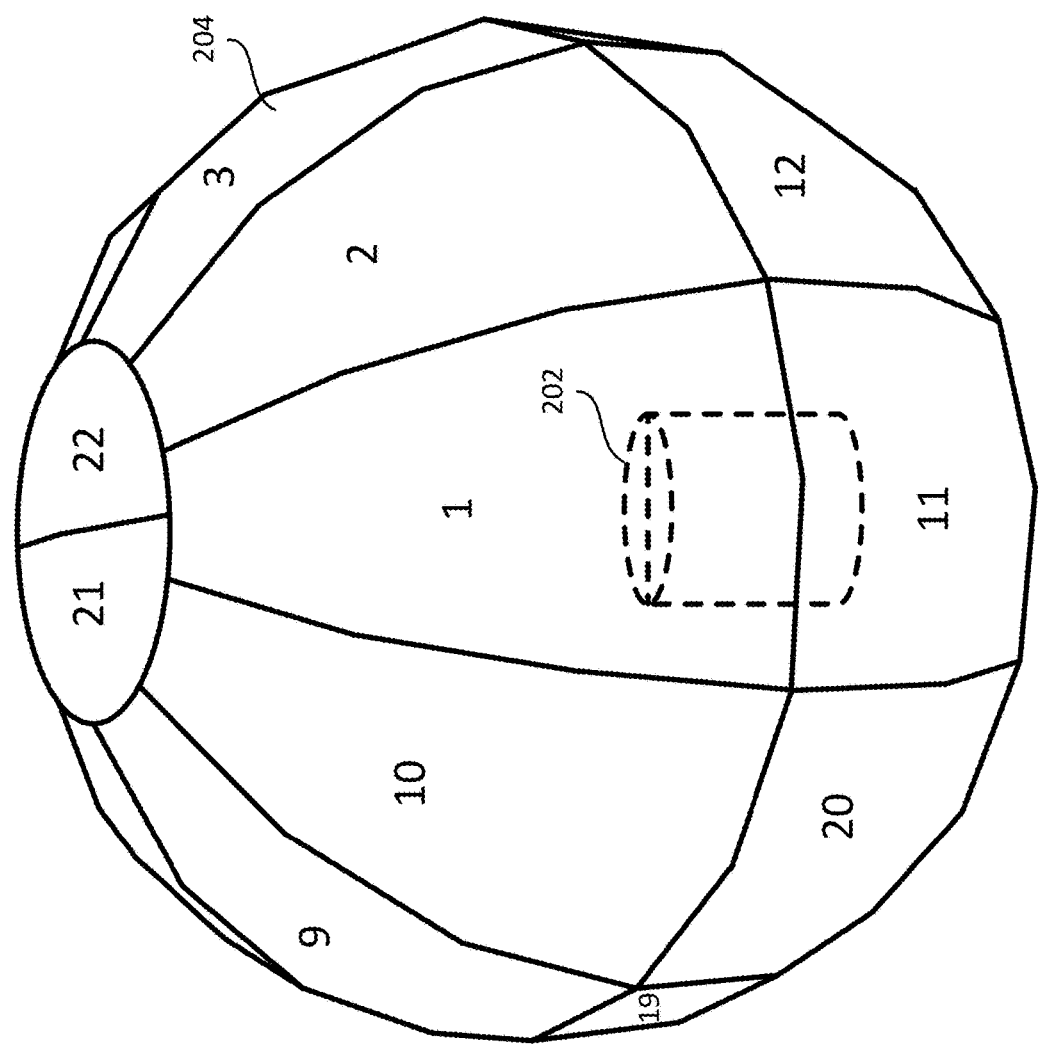
FIG. 2A schematically depicts an instructed image capturing process according to certain embodiments of the present disclosure.

The image capturing module 122 is configured to instruct the image capturing device 150 to capture images of an object, and send the captured images to the 3D mesh construction module 124. The captured images may be a video having many frames, and the image capturing module 122 may be configured to provide an instruction interface for taking keyframes during the image capturing process. FIG. 2A schematically depicts an instructed image capturing process according to certain embodiments of the present disclosure. As shown in FIG. 2A, for a target object 202, for example one shoe or a coffee maker, a virtual globe 204 is predefined, and the surface of the virtual globe 204 has 22 areas. The virtual globe 204 includes areas 1-22. The areas 1-10 and the areas 11-20 may be substantially equally separated at top hemisphere and lower hemisphere of the globe 204, and each of the pieces 1-10 or 11-20 may correspond to 36 degrees of the globe 204. The top areas 21 and 22 are located on the top of the object 202, and is a small area comparing to the whole area of the globe 204. A video from different angles may be captured, and the video is preferably taken around the object 202 from a side and above view. The video images include keyframes. The keyframes may include ten images 1, 2, . . . , 10 above and around the object 202, ten images 11, 12, . . . , 20 around the object 202, and two images 21 and 22 on top of the object 202, where the images 1-22 correspond to the areas 1-22. When a user places the image capturing device 150 to aim at the object 202 and the image substantially covers a specific area, such as the area 1, the surrounding lines of the area 1 may be highlighted in an graphic interface of the image capturing device 150, such that the user can take a specific image corresponding to the area 1. In certain embodiments, the areas may be defined differently. For example, it may not be necessary to take images in the areas 11-20. In certain embodiments, it may not be necessary to take images in the areas 21 and 22. In certain embodiments, the number of images taken may vary, for example, from 5-20 instead of the areas 1-10. The capturing of images at predefined areas ensures good representation of the whole scene. In certain embodiments, the image capturing device 150 is a RGB camera and takes RGB images. In certain embodiments, the image capturing device 150 is a RGBD camera and takes both RGB images and depth images. When the image capturing device 150 is the RGBD camera, the image capturing device 150 or the image capturing module 122 may further include a function of synchronizing the RGB images and the depth images.

The 3D mesh construction module 124 is configured to, upon receiving the captured images from the image capturing module 122, process the video images to construct a 3D mesh and calculate camera poses for the images, and provide the keyframes of the captured images and the corresponding camera poses, and the 3D mesh to the initial texturing module 126. The images may include, for example, synchronized RGB images and depth images. The 3D mesh is also named a 3D geometry, and is a three dimensional model of the object 202. The 3D mesh may be consisted of polygon meshes or triangle meshes, which form surface of the 3D mesh. The images are registered against the 3D mesh using the camera poses. The camera poses may be in a form of a camera projection matrix. For example, each camera pose may be a 4×4 matrix, with a coordinates of (x, y, z, h), where x, y, z are 3D coordinates of the camera and h is the homogeneous coordinate. In other words, each captured image is registered with a camera pose, which indicates where the captured image is taken and what direction the image capturing device 150 is aiming. In certain embodiments, the registration include intrinsic and extrinsic parameters of the camera.

Figure 2B:
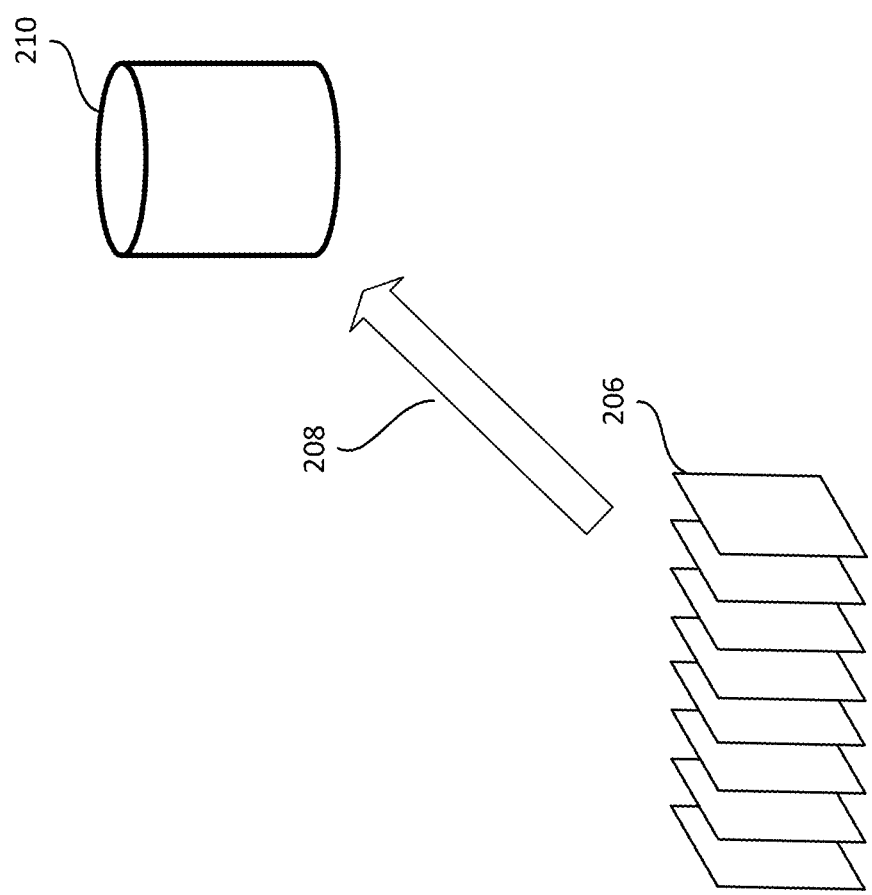
FIG. 2B schematically depicts a process of 3D mesh construction according to certain embodiments of the present disclosure.

In certain embodiments, the 3D mesh construction module 124 is configured to fuse the RGB images and the depth images into the 3D mesh using a fusion-based scanning technique. In certain embodiments, the 3D mesh construction is performed using KinectFusion (Richard A Newcombe, et al., KinectFusion: real-time dense surface mapping and tracking, 10th IEEE International Symposium on Mixed and Augmented Reality (ISMAR), 2011, 127-136, incorporated herein by reference in its entirety). The KinectFusion may generate both the 3D mesh and the camera poses from the RGB images and depth images. Since the resolution of the depth images is limited, the camera poses generated by the KinectFusion may be inaccurate. In certain embodiments, in order to further improve the accuracy of camera pose information, the 3D mesh construction module 124 is configured to generate the 3D mesh by combining the fusion-based scanning technique with a multi-view stereo technique. In certain embodiments, the final projection matrix is the weighted combination of these two techniques. In certain embodiments, the weight ratio of the fusion-based technique is about 40%-80%, and the weight ratio of the multi-view stereo technique is about 60%-20%. In certain embodiments, the weight ratio of the fusion-based technique is about 50%-70%, and the weight ratio of the multi-view stereo technique is about 50%-30%. In certain embodiments, the weight ratio of the fusion-based technique is about 60%, and the weight ratio of the multi-view stereo technique is about 40%. Kindly note that the present disclosure may also use either the fusion-based scanning technique or the multi-view stereo reconstruction technique independently for the 3D mesh construction and camera poses determination. FIG. 2B schematically depicts the process of 3D mesh construction, where the captured images 206 are used by at least one of the fusion-based scanning technique and the multi-view stereo technique 208 to generate the 3D mesh 210.

The initial texturing module 126 is configured to, upon receiving the 3D mesh 210, the keyframes 212, and the camera poses corresponding to the keyframes 212 from the 3D mesh construction module 124, use the keyframes 212 and the camera poses of the keyframes 212 to generate an initial texture mapping on the 3D mesh 210 to obtain the initially textured 3D mesh 216, and send the keyframes 212, the camera poses of the keyframes, and the initially textured 3D mesh 216 to the guidance image generation module 128. In certain embodiments, the initial texturing module 126 is configured to perform the initial texturing using the keyframes 212 by a blending-based technique. In certain embodiments, the blending-based technique is the one described by Qian-Yi Zhou and Vladlen Koltun in Color Map Optimization for 3D Reconstruction with Consumer Depth Cameras, ACM Transactions on Graphics, 33(4), 2014, which is incorporated herein by reference in its entirety. The blending-based technique is able to output a roughly registered color map for the geometric model. In certain embodiments, the present disclosure adopts the blending-based technique instead of other kinds because the blending-based technique has some resistance against camera drifting and light variation challenges. The outputted, roughly optimized texture map may suffer from blurring. FIG. 2C schematically depicts the initial texturing process according to certain embodiments of the present disclosure, where the keyframes 212 are used by the blending-based technique 214 to obtain the initially textured 3D mesh 216.

Figure 2D:
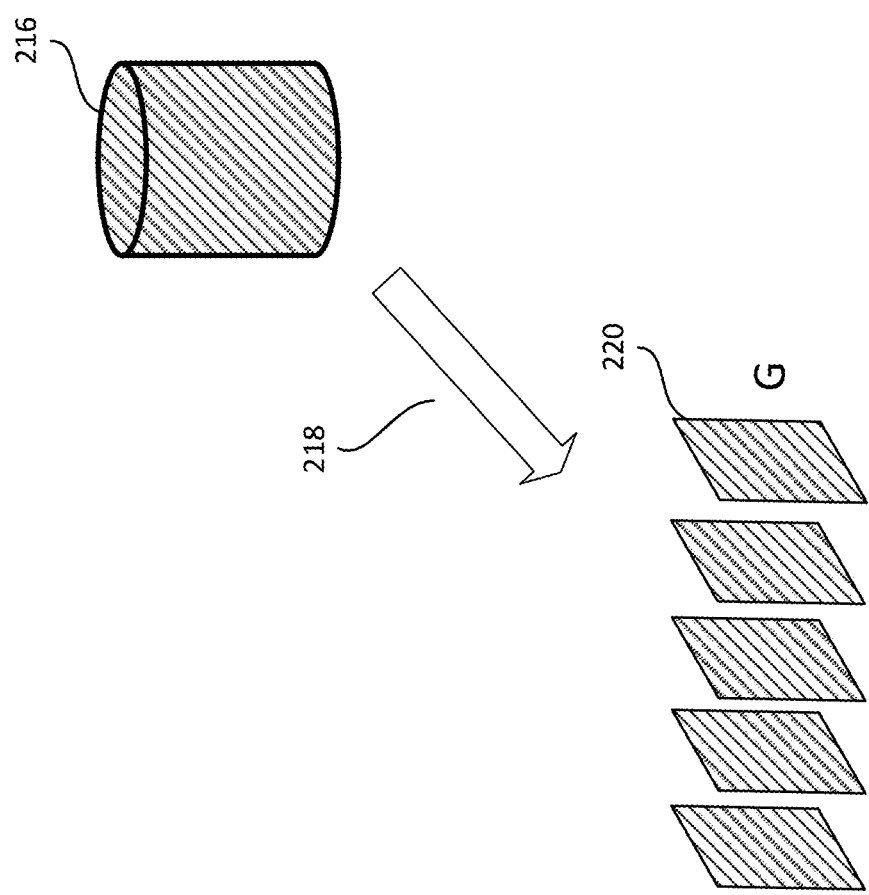
FIG. 2D schematically depicts a process of generating guidance images according to certain embodiments of the present disclosure.

The guidance image generation module 128 is configure to, upon receiving the keyframes 212 (S), the camera poses of the keyframes 212, and the initially textured 3D mesh 216 from the initial texturing module 126, project the texture of the initially textured 3D mesh 216 to each of the camera locations corresponding to the keyframes 212, to obtain guidance images G, and send the keyframes 212 and the guidance images G to the guidance image enhancing module 130. Each guidance image corresponds to one keyframe 212, and the corresponding guidance image and the keyframe 212 correspond to the same camera pose. FIG. 2D schematically depicts the process of generating the guidance images, where the texture of the initially textured 3D mesh 216 is projected at step 218 to form the guidance images 220. In certain embodiments, the projection may be defined by x=PX. x=(u, v, 1) indicates coordinates of a pixel in the guidance image 220, u and v are coordinates on the horizontal and vertical axes, and 1 is the homogeneous coordinate. P is the camera pose, which is the same for both the keyframe 212 and its corresponding guidance image 220. X=(x, y, z, 1) indicates a pixel on the initially textured 3D mesh 216. The keyframe 212 and its corresponding guidance image 220 are almost the same except for their colors. The color of the guidance image 220 is projected from the initially textured 3D mesh 216. Because the color of a pixel on the initially textured 3D mesh 216 may come from several keyframes 212 using the blended-based technique, the color on the initially textured 3D mesh 216 and subsequently the guidance image 220 are likely to be blurring.

The guidance image enhancing module 130 is configured to, upon receiving the keyframes 212 and the guidance images 220, update the color on the guidance images 220 to obtain enhanced guidance image T, and send the keyframes 212, the guidance images 220, and the enhanced guidance image T to the dense flow warping module 132. While the guidance images 220 are blurring, they provide a holistic knowledge of the scene and how each keyframe 212 should look like under current calculated projection condition. To get the desired warped images from the keyframes 212, the disclosure uses a unified framework combining patch-based matching by the guidance image enhancing module 130 and dense flow field calculation by the dense flow warping module 132. The patch-based matching helps to get a clearer guidance image which is important to the following process, and subsequently the dense flow field calculation can well mitigate the artifacts in guidance images that are caused by misprojection.

Each of the source keyframes 212 and the corresponding guidance image 220 are rendered under the same camera pose setting. While there are some pixel-wise shifting, most content is still similar. Therefore, for each pixel in the guidance image 220, the disclosure finds a correspondence in the source image 212 that best represents the local pattern around this pixel. In certain embodiments, this local similarity is defined as weighted sum squared difference. Then the disclosure uses the selected pixel color in the source mage 212 to replace its corresponding one in the guidance image 212 to form a new enhanced guidance image T. In certain embodiments, in order to overcome the influence of light variation, the disclosure performs this in gray-scale. To further guarantee consistency of the recovered results, when a new enhanced image T is obtained, it is back-projected onto the original guidance image 220 to correct those resynthesized pixels. This process verifies that each newly recovered guidance image T is consistent with the original guidance image 220. Another problem has to take into consideration is how to efficiently find the pixel-wise correspondence. In certain embodiments, the rendered guidance images only contain the color information of reconstructed mesh, whereas the others are in NONE values. Hence it is necessary to skip process these pixels. Moreover, because of the similar content between the source image 212 and its guidance image 220, it is possible to define the search range to be a small limited square around that coordinate in source image plane.

Figure 2E:
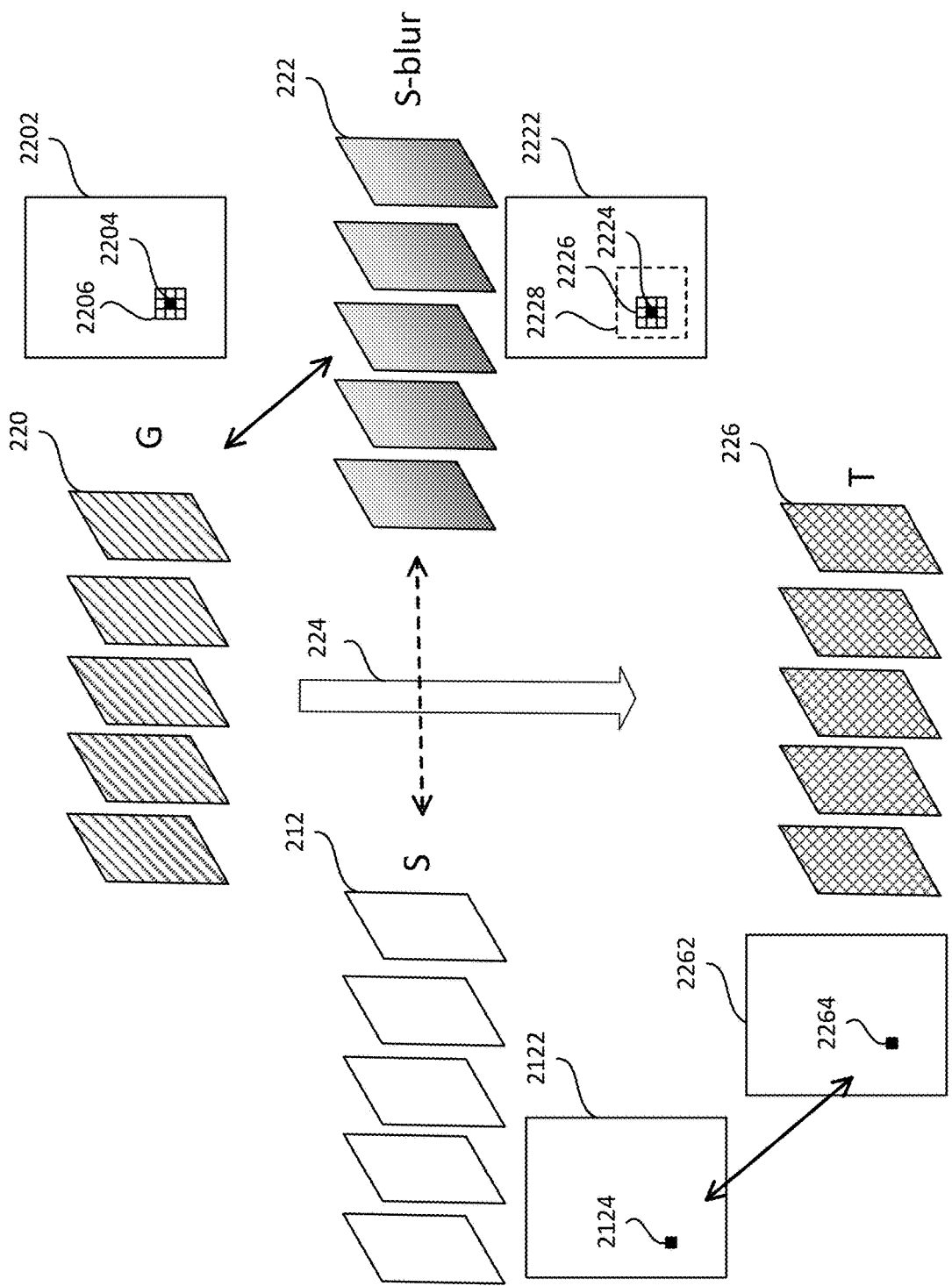
FIG. 2E schematically depicts generating of enhanced guidance images according to certain embodiments of the present disclosure.

FIG. 2E schematically depicts generating of the enhanced guidance images according to certain embodiments of the present disclosure. As shown in FIG. 2E, for each keyframe 212 and its corresponding guidance image 220, the keyframe 212 is blurred to obtain a corresponding blurred keyframe 222. The blurring process may be performed by a Gaussian filter. For each pixel 2204 in one guidance image 2202, a guidance image patch 2206 consisting the pixel 2204 is defined. The guidance image patch 2206 may be a 3×3 pixel patch, or a 5×5 pixel patch, with the pixel 2204 in the center. The guidance image enhancing module 130 searches the patch in the corresponding blurred keyframe 2222 that best matches the guidance image patch 2206. In certain embodiments, because the best matched patch 2226 is presumed to be close to the position of the guidance image patch 2206 relative to their pixel positions, the search is performed in a limited area 2228. In other words, if the guidance image patch 2206 is directly copied to the blurred image 2222, it would locate in the center of the area 2228. The size of the area 2228 may be, for example, about 20×20 pixels to 100×100 pixels. In certain embodiments, the area 2228 is about 30-50×30-50 pixels. In certain embodiments, the area 2228 is 30×30 pixels, or 40×40 pixels, or 50×50 pixels. In the area 2228, the patch 2226 best matches the patch 2206. Kindly note that the pixel location of the patch 2226 in the blurred image 2222 is slightly different from the location of the patch 2206 in the guidance image 2202. By defining the limited search area and performing search using patches, the search is performed more efficiently. After obtaining the matched patch 2226, the pixel 2224 corresponding to the pixel 2204 is determined. The pixel 2224 in the blurred image 2222 directly corresponds to the pixel 2124 in the corresponding keyframe 2122. The guidance image enhancing module 130 then copies the color of the pixel 2124 to the location of the pixel 2204 in the guidance image 2202. By replacing colors of all the pixels in the guidance image 2202 with colors of the corresponding pixels in the keyframe 2122, the enhanced guidance image 2262 is obtained, where the location of the pixel 2264 in the enhanced guidance image 2262 corresponds to the location of the pixel 2204 in the guidance image 2202, while the color of the pixel 2264 in the enhanced guidance image 2262 corresponds to the color of the pixel 2124 of the keyframe 2122. Kindly note that the images 2122, 2202, 2222, 2262 correspond to the same camera pose.

The dense flow warping module 132 is configured to, upon receiving the keyframes 212, the guidance images 220, and the enhanced guidance images 226, optimize the dense flow field of the keyframes 212 using the enhanced guidance images 226 to obtain warped images S', and send the warped images S' and the guidance images 220 to the color harmonization module 134. The dense flow warping is performed by calculating dense flow field. Specifically, while the patch-based synthesis can produce a clear enhanced guidance image 226, only replacing the guidance image pixels is insufficient, as the artifacts within the guidance images would still exist after replacing and even be amplified, such as misprojected or duplicated patterns. In order to overcome this issue, the dense flow warping module 132 is configured to calculate the dense flow field to formulate the final warped views for rendering. In certain embodiments, the field offers two scalars for each source pixel from the keyframes, which respectively indicate its movement in x and y direction. For example, the color of a pixel may be moved a few pixels according to the calculated x and y movement. In contrast to pixel replacement, the flow field calculation aligns in a more holistic manner, which keeps the high computation efficiency and at the same time ensures that each result image contains most of the information from its corresponding source image in a visually coherent way. On the other hand, the performance of dense flow field calculation is closely related to the clarity of guidance images. So, the above patch-based synthesis process is also essential in order to get an enhanced guidance image, in particular at the boundary of foreground content.

FIG. 2F schematically depicts the dense flow warping process according to certain embodiments of the present disclosure. As shown in FIG. 2F, the colors of the pixels in the keyframes 212 may be moved at process 228 according to the enhanced guidance images 226, so as to obtain the warped images 230. In certain embodiments, the process is performed according to Michal Irani and Shmuel Peleg, Improving resolution by image registration, CVGIP: Graphical Models and Image Processing, 1991, 53(3): 231-239, which is incorporated herein by reference in its entirety.

The color harmonization module 134 is configured to, upon receiving the warped images 230 and the guidance images 220 from the dense flow warping module 132, harmonize the color in the warped image 230 according to the guidance image 220, to obtain harmonized images S", and send the harmonized image S" to the texturing module 136. Although the guidance image enhancing module 130 and the dense flow warping module 132 build the pixel correspondence between keyframes and guidance images, however, this does not ensure the light condition between these two sets is consistent. Based on the available guidance images, the color harmonization module 134 is configured to synchronize the light condition of each warped image and make them converge towards the guidance condition. Note that the guidance images used in this step are the original ones 220 not the enhanced 226, as the potential inconsistency cross views. In certain embodiments, the disclosure utilizes a style-based color harmonization method. Generally, the style information is represented in the form of both color and detail distribution. However, as the two images are registered in previous step, which means the details are approximately the same, so the main difference occurs in the color information. Transferring the style from guidance images to warped images is equivalent to harmonize the light condition between them. So, the final rendering images would have the similar light condition to guidance images but much clearer. In certain embodiments, the color harmonization module 134 makes use of the Laplacian pyramid to extract the style of these two images. More specifically, the disclosure does not fully form the cascade structure from bottom to top. Instead, the disclosure only makes use of the top level of the pyramid, as the upper levels preserve more on style than content. In certain embodiments, six-level is sufficient to abstract the style for our application. The final layer can be easily formed by filtering the input image using a Gaussian kernel with standard deviation $\sigma=2^6$ and window size $r=5\sigma$. No downsamplings or multiple filterings are required. After getting two style maps respectively from the warped image and guidance image, the final image used for rendering under this viewpoint pose is established by subtracting the style map from warped image then adding the guidance one.

FIG. 2G schematically depicts the above light harmonization process according to certain embodiments of the present disclosure. As shown in FIG. 2G, the warped image 230 and the guidance images 220 are subjected to Laplacian pyramid processing 232, the Laplacian pyramid is performed with six-levels, and the first to fifth levels from the warped image 230 and the sixth level from the guidance image 220 are combined to form the harmonized images 234. In certain embodiments, the process shown in FIG. 2G is performed according to YiChang Shih et al., Style transfer for headshot portraits, ACM Transactions on Graphics, 2014, 34(4), 148: 1-14, which is incorporated herein by reference in its entirety. In certain embodiments, the present disclosure further improves the YiChang's method by removing the calculation of the energy components, which increases the calculation speed.

The texturing module 136 is configured to, upon receiving the harmonized images 234 from the color harmonization module 134, using the harmonized images 234 to render the 3D mesh to obtain textured 3D mesh. In certain embodiments, the present disclosure adopts the face-based method to associate each triangle face of the 3D mesh with a rendering image, i.e., the harmonized image, and update its texture on the reconstructed mesh using the image. The present disclosure considers two methods in selecting the harmonized image 234 for rendering a specific triangle face of the 3D mesh. (1) The disclosure determines that the angle between face normal and the line connecting face center and camera center is a good metric for rendering view selection. The determined image by the angle is preferred than the image captured from frontal direction of the face, and those images observing the object from large side viewpoints are discarded by this method. (2) In view selection, one problem needs to be aware is the inconsistency between visual image content and exact reconstructed mesh. If a view contains a region, such as a shoelace, that has not been reconstructed, it should not be chosen for texturing the faces behind the region. Unfortunately, this happens frequently in reality, especially for the shoe category. To solve this challenge, the disclosure takes the knowledge from depth images. As such misprojection problem always occurs at the boundary of each image where different surfaces are observed, the disclosure can find the boundary easily via detecting the edge cue from depth images. If the selected view is close to a boundary in depth image, that means it has a risk for this problem, it is better to lessen its weight in view selection. The boundary can be obtained by conducting, for example, Canny operator on depth images. In certain embodiments, the texturing module 136 is configured to combine this metric and the angle term in a linear representation for desired view candidate selection. The combined metric is used to determine the harmonized image for each triangle face. After view selection, the texture patches are packed into texture atlases, and texture coordinates are attached to the vertices.

In certain embodiments, the above considerations of triangle face directions and boundaries for rendering the 3D mesh are realized as follows. The texturing module 136 is configured to, for each triangle face (or polygon face) of the 3D mesh, determine a normal direction of the triangle face outward to obtain a normal line, connect the center of the triangle face and the center of a camera pose to obtain a connection line, calculate an angle α in degrees between the normal line and the connection line, and determine a direction score by $$z_1 = \frac{90 - \alpha}{90}.$$

Accordingly, when the normal line and the connection line overlaps, corresponding camera pose has the highest score of 1, and when the normal line is perpendicular to the connection line, the corresponding camera pose has the lowest score of 0. The direction score for one camera pose is also the direction score for the harmonized image corresponding to the camera pose.

The texturing module 136 is configured to, for each triangle face, determine a corresponding area in each of a few harmonized images that are possible to be used for rendering the triangle face; then for each harmonized image, detect boundaries using Canny operator, and calculate the distance between the area and the detected boundary or boundaries, where the distance d may be between the boundary and the pixel in the area that is the closest to the boundary. The unit of the distance d may be in pixels, and is used to calculate a boundary distance score. When the distance d is greater than 50 pixels, the boundary distance score $z_2$=1. When the distance d equals to or is less than 50 pixels, the boundary distance score $$z_2 = \frac{d}{50}.$$

For each triangle face, the overall score z of a harmonized image is a weighted summation of the direction score $z_1$ and the distance score $z_2$. The weight ratio between the direction score $z_1$ and the distance score $z_2$ may be in a range of 4 to 0.68, for example, 80:20, 70:30, 60:40, 50:50, or 40:60. In certain embodiments, the weight of the direction score $z_1$ is greater than the distance score $z_2$. In certain embodiments, the weight ratio is 60:40, and the overall score z=0.6×$z_2$+ 0.4×$z_2$. For each triangle face, there are several possible harmonized images that captures the triangle face area of the object. The texturing module 136 is configured to calculate the overall score of the harmonized images, rank the overall scores, and select the one harmonized image having the highest overall score to render the triangle face. In certain embodiments, the rendering of the triangle face using the harmonized image is performed according to Michael Waechter, Nils Moehrle and Michael Goesele, Let There Be Color! Large-Scale Texturing of 3D Reconstructions, In ECCV, 2014, which is incorporated herein by reference in its entirety.

Figure 2H:
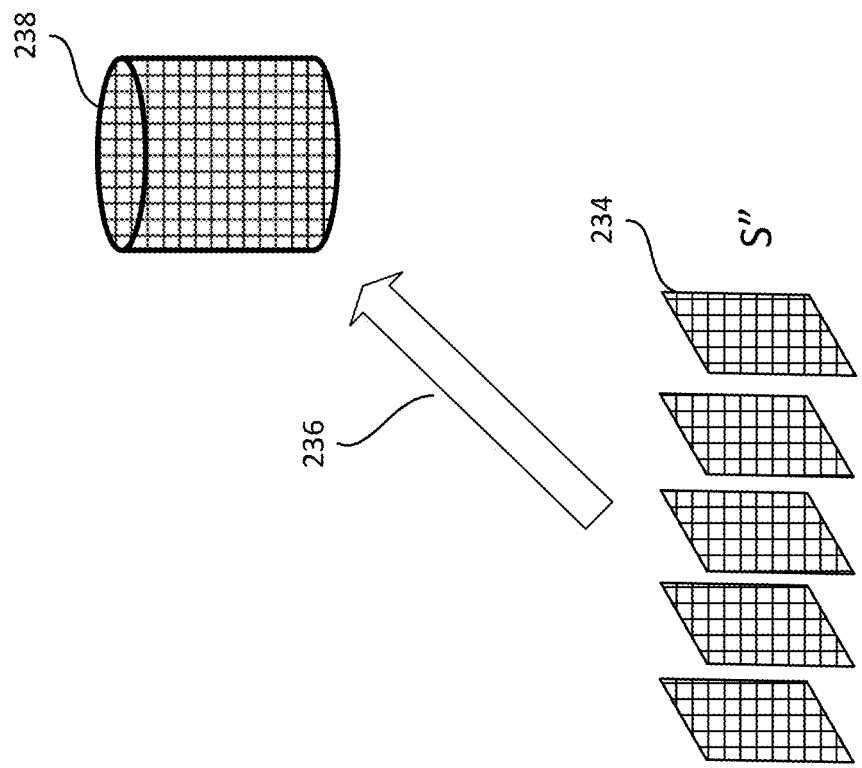
FIG. 2H schematically depicts a rendering process according to certain embodiments of the present disclosure.

FIG. 2H schematically depicts the rendering process according to certain embodiments of the present disclosure. As shown in FIG. 2H, the harmonized images 234 are used to render the 3D mesh so as to obtain textured 3D mesh 238. The rendering process 236 include, for each triangle face of the 3D mesh, calculating overall scores for each of a few harmonized images that can capture the triangle face area of the object, determining the one of the few harmonized images that has the highest overall score, and using the harmonized image having the highest overall score to render the triangle face. After each of the triangle faces of the 3D mesh is rendered this way, the whole 3D mesh is well rendered.

Kindly note that while the guidance images are generated after camera optimization and blending, the guidance images do not guarantee that they do not contain any misalignment. So, the present disclosure is designed to overcome this problem. After one time process, the outputted texture of the 3D mesh would become clearer and have less misalignment, but in some challenging scenes, one iteration may be not enough. In that case, it is better to repeat the functions of the initial texture module 126, the guidance image generation module 128, the guidance image enhancing module 130, the dense flow warping module 132, the color harmonization module 134, the texture module 136 for one or more times. Accordingly, in certain embodiments, the texture mapping application 118 further includes the texture evaluation module 138. The texture evaluation module 138 is configured to evaluate the rendering effect of the rendered 3D mesh, instruct the texture mapping application 118 to end the process if the rendered 3D mesh is in satisfaction, and instruct the texture mapping application 118 to perform another round of the rendering process if the rendered 3D mesh is not good enough. In each iteration of the rendering process, the guidance images would be different because they come from the most recently rendered 3D mesh.

The evaluation of the rendering effect may be determined by accepting an input from a user, where the user views the final rendering effect of the rendered 3D mesh and provides an opinion as input to the texture mapping application 118. In certain embodiments, the evaluation may also be determined automatically by projecting the rendered 3D mesh to the camera poses of the keyframes, comparing the projections with the captured keyframes to see the difference, and determining the rendering effect is in satisfaction when the difference is less than a threshold or a predefined standard.

The user interface 138 is configured to provide a user interface, for example, a graphic user interface, to the users. The user may use the interface to guide his taking video and keyframes of the object, enter or revise parameters of the texture mapping application 118, input whether the rendered 3D mesh is in satisfaction, and when the rendered 3D mesh is in satisfaction, store the rendered 3D mesh to the computing device 110 and/or the server computing device 170.

In certain embodiments, the rendered 3D mesh stored in the computing device 110 and/or the server computing device 170 is accessible to the remote computing device 180. The remote computing device 180, for example, can be a mobile phone of a customer of an e-commerce platform. As shown in FIG. 1, the remote computing device 180 includes a processor 182, a memory 184 and a storage 186. The feature of the processor 182, the memory 184 and the storage 186 is substantially the same as that described above relative to the processor 112, the memory 114, and the storage 116 of the computing device 110. The storage device 186 include a virtual fitting application 187. The virtual application 187, when being launched on the remote computing device 180, provides an interface for the customer to interact with an e-commerce service provided by the server computing device 170. In certain embodiments, the customer may select a product, such as one shoe, from the e-commerce service via the interface, and according to an instruction from the interface, use the camera 188 to capture live video of his foot, and the virtual fitting application 187 is configured to retrieve the rendered 3D mesh of the shoe, detect the customer's feet, and place the rendered 3D mesh on the customer's foot, and according to the view angle movement of the camera 188 and the activity of the customer's foot, display the rendered 3D mesh of the shoe in line with the customer's foot at real time. In certain embodiments, the product may be other products such as a coffee maker or stuffy toys, and the customer may use the virtual fitting application 187 to view the rendered 3D mesh of the product from different view angles by moving the rendered 3D mesh via touch screen of the remote computing device 180.

In certain embodiments, the virtual fitting application 187 may include or be linked to an order application so that the customer can, if satisfied with the fitted product, order the product.

In certain embodiments, the rendered 3D mesh of the products and the virtual fitting application 187 may be stored in the computing device 110, and the customer may use the virtual fitting application 187 offline.

In certain aspects, the present disclosure relates to a method for 3D mesh construction and texture mapping. FIG. 3 schematically depicts a method for 3D mesh construction and texture mapping according to certain embodiments of the present disclosure. In certain embodiments, the method is implemented by the computing device 110 shown in FIG. 1. It should be particularly noted that, unless otherwise stated in the present disclosure, the steps of the method may be arranged in a different sequential order, and are thus not limited to the sequential order as shown in FIG. 3.

At procedure 302, a customer uses the image capturing device 150 to capture video images 206 of an object 202, and the image capturing module 122 sends the captured video images 206 to the 3D mesh construction module 124. In certain embodiments, the video images 206 is taken around the object 202 and is preferably from side and above views. The video images 206 include keyframes 212 captured at predefined viewpoints.

At procedure 304, upon receiving the capture images 206, the 3D mesh construction module 124 uses a fusion-based scanning technique to construct the 3D mesh 210 of the object 202, calculate camera poses corresponding to the video images, and sends the constructed 3D mesh 210, the keyframes 212 of the captured images 206, and the camera poses corresponding to the keyframes 212 to the initial texturing module 126. In certain embodiments, the captured images 206 include synchronized RGB images and depth images. In certain embodiments, each video image has a corresponding camera pose. In certain embodiments, the fusion-based scanning technique is KinectFusion. In certain embodiments, instead of using the fusion-based scanning technique, the 3D mesh construction module 124 may also uses a combination of the fusion-based scanning technique and multi-view stereo technique, where the fusion-based scanning technique may have more weight than the multi-view stereo technique.

At process 306, upon receiving the keyframes 212, the camera poses corresponding to the keyframes 212, and the 3D mesh 210 from the 3D mesh construction module 124, the initial texture module 126 uses the keyframes 212 and their corresponding camera pose to initially texture the 3D mesh 210, to obtain the initial textured 3D mesh 216, and sends the keyframes 212, their corresponding camera poses, and the initially textured 3D mesh 216 to the guidance image generation module 128. In certain embodiments, the texturing of the 3D mesh 210 is performed using a blending-based technique.

At procedure 308, upon receiving the keyframes 212, their corresponding camera poses, and the initially textured 3D mesh 216 from the initial texture module 126, the guidance image generation module 128 projects the texture from the initially textured 3D mesh 216 to the camera locations corresponding to the keyframes 212, to obtain guidance images 220 (G), and sends the keyframes 212 (S) and the guidance images 220 (G) to the guidance image enhancing module 130. Each guidance image 220 corresponds to one of the keyframes 212, and the corresponding keyframe and guidance image correspond to the same camera pose.

At procedure 310, upon receiving the keyframes 212 and the guidance images 220 from the guidance image generation module 128, the guidance image enhancing module 130 updates the color on the guidance images 220 to obtain enhanced guidance images 226, and sends the keyframes 212, the guidance images 220, the enhanced guidance images 226 to the dense flow warping module 132.

FIG. 4 schematically depicts a method for generating enhanced guidance image 226 from the guidance image 220 according to certain embodiments of the present disclosure. In certain embodiments, the method is implemented by the computing device 110 shown in FIG. 1. It should be particularly noted that, unless otherwise stated in the present disclosure, the steps of the method may be arranged in a different sequential order, and are thus not limited to the sequential order as shown in FIG. 4. As shown in FIG. 4, at procedure 402, the guidance image enhancing module 130 blurs the keyframes 212 to obtain blurred images 222. For each guidance image 2202, there is a corresponding keyframe 2122 and a blurred image 2222. At procedure 404, for each target pixel 2204 in the guidance image 2202, the guidance image enhancing module 130 defines a patch 2206, which could be a 3×3 patch having 9 pixels, with the target pixel 2204 at the center of the patch 2206. The target pixel 2204 has a corresponding blurred pixel in the blurred image 2222, where the pixel location of the target pixel 2204 in the guidance image 2202 is the same as the pixel location of the blurred pixel in the blurred image 2222. At procedure 406, the guidance image enhancing module 130 defines a search area 2228 in the blurred image 2222, where the center of the search area 2228 is substantially the blurred pixel corresponding to the pixel 2204, and the size of the search area 2228 is, for example, a square with a side length of about 30-50 pixels. At procedure 408, the guidance image enhancing module 130 searches in the area 2228 for a patch 2226 that best matches the patch 2206, and the center of the patch 2206 is the pixel 2224, and the pixel 2224 in the blurred image 2222 thus corresponds to the pixel 2204 in the guidance image 2202. At procedure 410, the guidance image enhancing module 130 locates a pixel 2124 in the keyframe 2122 corresponding to the pixel 2224 in the blurred image 2222. In other words, the pixel coordinates of the pixel 2124 in the keyframe 2122 is the same as the pixel coordinates of the pixel 2224 in the blurred image 2222. At procedure 412, the guidance image enhancing module 130 uses the color of the pixel 2124 to replace the color of the pixel 2204 in the guidance image 2202. By replacing the colors of all the pixels in the guidance image 2202, the enhanced guidance image 2262 is obtained. The above process is performed on each of the guidance images 220, to obtain the enhanced guidance images 226.

Referring back to FIG. 3, at procedure 312, upon receiving the keyframes 212, the guidance images 220, and the enhanced guidance images 226 from the guidance image enhancing module 130, the dense flow warping module 132 optimizes dense flow field of the keyframes 212 according to the enhanced guidance images 226 to obtain warped images 230, and sends the guidance images 220 and the warped images 230 to the color harmonization module 134. In certain embodiments, the procedure 312 involves minor color movements of certain pixels in the keyframe 212, and the color in the warped image 230 is more consistent when viewed as a whole.

At procedure 314, upon receiving the guidance images 220 and the warped images 230 from the dense flow warping module 132, the color harmonization module 134 harmonizes color in the warped images 230 according to the color of the guidance images 220, to obtain harmonized images 234, and sends the harmonized images 234 to the texturing module 136. In certain embodiments, the harmonization is performed using Laplacian pyramid. For each pair of the guidance image 220 and the warped image 230, a six-level Laplacian is performed respectively on the pair of images. The sixth level result from the processed guidance image 220 is used to replace the sixth level result from the warped image 230, so as to obtain the corresponding harmonized image 234.

At procedure 316, upon receiving the harmonized images 234 from the color harmonization module 134, the texturing module 136 adding textures to the 3D mesh 210 or replacing the texture of the initially textured 3D mesh 216, to obtain the textured 3D mesh 238.

In certain embodiments, the procedures 308-316 may be performed iteratively for a few times, such that the texture of the textured 3D mesh 238 is optimized. In each iteration, the initially textured 3D mesh is updated, and the guidance images are updated.

Figures 5, 6:
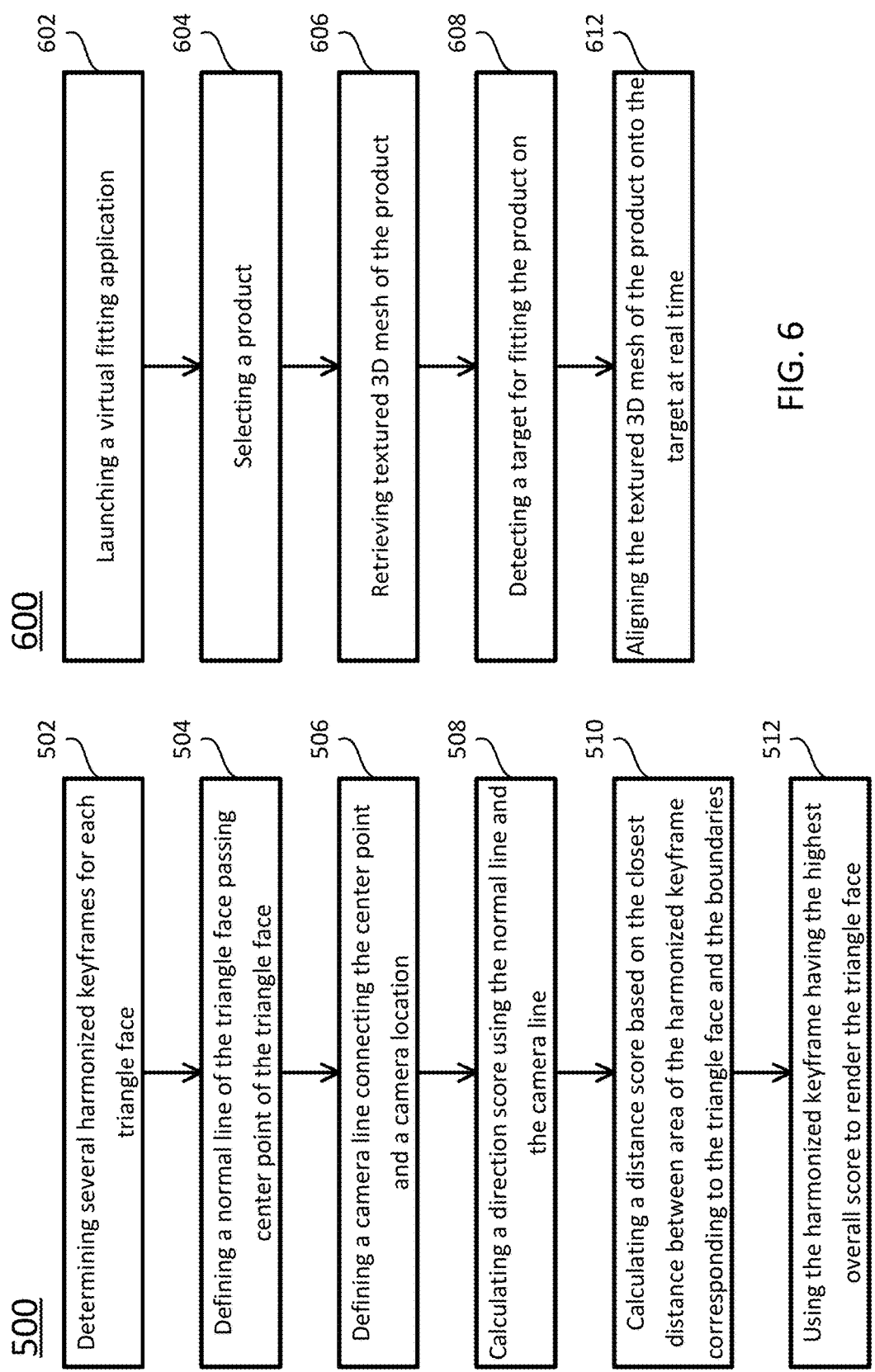
FIG. 5 schematically depicts a method for texturing or rendering a 3D mesh from harmonized images according to certain embodiments of the present disclosure.
FIG. 6 schematically depicts a method for virtual fitting according to certain embodiments of the present disclosure.

FIG. 5 schematically depicts a method for texturing or rendering the 3D mesh 210 from the harmonized images 234 according to certain embodiments of the present disclosure. In certain embodiments, the method is implemented by the computing device 110 shown in FIG. 1. It should be particularly noted that, unless otherwise stated in the present disclosure, the steps of the method may be arranged in a different sequential order, and are thus not limited to the sequential order as shown in FIG. 5. As shown in FIG. 5, at procedure 502, for each triangle face of the 3D mesh 210, the texturing module 136 determines several harmonized keyframes 234 that have captured the triangle face. In other words, the triangle face of the 3D mesh is seen in the several harmonized keyframes 234. At procedure 504, the texturing module 136 locates a center point of the triangle face, and define a normal line passes the center point of the triangle face and is normal to the triangle face. At procedure 506, for each of the several harmonized keyframes 234, the texturing module 136 connects the center point of the triangle face to the camera location corresponding to the keyframe 234, to obtain a camera line. At procedure 508, the texturing module 136 measures the angle α between the normal line and the camera line, and calculate a direction score based on the angle. The direction score is defined as $$z_1 = \frac{90 - \alpha}{90}.$$

At procedure 510, the texturing module 136 locates boundaries for the above harmonized keyframes 234, defines an area in the harmonized keyframe 234 that corresponds to the triangle face, and finds the closest distance d between the pixels in the area the boundaries. The texturing module 136 then uses the closest distance d to calculate a distance score based on a predefined threshold. In certain embodiments, the threshold is 50 pixels. The distance score equals to 1 if the closest distance d is greater than 50 pixels, and the distance score is calculated by $$z_2 = \frac{d}{50}$$

when the distance d equals t or is less than the threshold. At procedure 512, the texturing module 136 calculates an overall score using weighted direction score and distance score, for example, by $z=0.6 \times z_2 + 0.4 \times z_2$. At procedure 514, the texture module 136 calculates the overall scores for all the several harmonized keyframes 234, and the harmonized keyframe 234 having the highest overall score is used to render the triangle face. By repeating the above process for each triangle face of the 3D mesh 210, the whole 3D mesh 210 is rendered to form the rendered or textured 3D mesh 238.

After the 3D mesh is well rendered or textured, the textured 3D mesh 238 is stored, for example in the server computing device 170 for latter use. In certain embodiments, the stored textured 3D mesh 238 can be used by a customer using the virtual fitting application 187. FIG. 6 schematically depicts a method for virtual fitting according to certain embodiments of the present disclosure. In certain embodiments, the method is implemented by the remote computing device 180 shown in FIG. 1. It should be particularly noted that, unless otherwise stated in the present disclosure, the steps of the method may be arranged in a different sequential order, and are thus not limited to the sequential order as shown in FIG. 6. As shown in FIG. 6, at procedure 602, the customer launches the virtual fitting application 187. The remote computing device 180 may be a mobile device, and the virtual fitting application, after being launched, provides an user interface to the customer on the mobile device. The launched application has access to the server computing device 170. At procedure 604, the customer selects a product via the user interface. At procedure 606, upon receiving the selection by the customer, the virtual fitting application 187 retrieves the textured 3D mesh of the product from the server computing device 170. The product may be, for example, one shoe. At procedure 608, the customer aims the camera 188 of the remote computing device 180 to one of his feet for fitting, and the virtual fitting application 187 detects his foot. At procedure 610, after detecting the foot, the virtual fitting application 187 aligns the textured 3D mesh of the shoe onto the foot. When the customer moves his foot, the virtual fitting application 187 tracks the movement of the foot, and aligns the 3D mesh of the shoe on the tracked foot at real time.

In certain embodiments, the method 600 may be modified for browsing other products. For example, if the selected product is a coffee maker, the virtual fitting application 187 may present the texture 3D mesh of the coffee maker on the touch screen of the remote computing device 180, and the customer may tough the screen to move or rotate the coffee maker, such that the customer can view the coffee maker from different angles.

In certain embodiments, the customer may view his house through the remote computing device 180, and the virtual fitting application 187 may provide a function to place the coffee maker in a specific location in the virtual reality environment, such as on a virtual image of a table in the house. The customer is able to place the coffee maker still on the table, and the customer can move around to see the effect of placing the coffee maker on the table.

In certain embodiments, the virtual fitting application 187 may further include an order interface or is linked with an order interface, such that the customer can order the product if he is satisfied with the fitting result.

In certain embodiments, the customer is a store owner, and the store owner may use a computing device and an image capturing device, such as the computing device 110 and the image capturing device 150. When the store owner has a new product, he can use the texture mapping device 116 to scan his new product, generate the textured 3D mesh of the new product, store the textured 3D mesh to his computing device 110 or the server computing device 170, and provide the texture 3D mesh to his customers when needed.

In certain aspects, the present disclosure relates to a non-transitory computer readable medium storing computer executable code. The code, when executed at a processor of a computing device, may perform the methods as described above. In certain embodiments, the non-transitory computer readable medium may include, but not limited to, any physical or virtual storage media. In certain embodiments, the non-transitory computer readable medium may be implemented as the storage device 116 of the computing device 110 or the storage device 186 of the remote computing device 180, as shown in FIG. 1.

Certain embodiments of the present disclosure, among other things, have the following beneficial advantages. (1) The present disclosure provides guidance images to guide the texture process, which is efficient to correct defects in the keyframes due to noisy camera pose, and prevent misalignment in the 3D mesh, this is novel in the field. (2) The present disclosure uses the guidance images to harmonize light differences in different keyframes, such that the light conditions of the keyframes can converge. (3) By selecting the best keyframe to render a specific triangle face of the 3D mesh, the present disclosure mitigates the texture drifting problem closing to the boundaries. By the specific design of the present disclosure, accurate and fast rendering of 3D meshes is achieved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES (WHICH ARE INCORPORATED HEREIN BY REFERENCE IN THEIR ENTIRETY)

[1] Qian-Yi Zhou, and Vladlen Koltun, Color map optimization for 3D reconstruction with consumer depth cameras, ACM Transactions on Graphics, 2014, 33(4), 15: 1-10.

[2] Michael Waechter, Nils Moehrle, and Michael Goesele, Let there be color! Large-scale texturing of 3D reconstructions, ECCV, 2014, 836-850.

[3] Yanping Fu, Qingan Yan, Long Yang, Jie Liao, and Chunxia Xiao, Texture mapping for 3D reconstruction with RGB-D sensor, Proceedings of the IEEE Conference on Computer Vision and Pattern Recognition (CVPR), 2018, 4645-4653.

[4] Yanping Fu, Qingan Yan, Jie Liao, and Chunxia Xiao, Joint texture and geometry optimization for RGB-D reconstruction, Proceedings of the IEEE/CVF Conference on Computer Vision and Pattern Recognition (CVPR), 2020, 5950-5959.

[5] Sai Bi, Nima Khademi Kalantari, and Ravi Ramamoorthi, Patch-based optimization for image-based texture mapping, ACM Transactions on Graphics, 2017, 36(4), 106: 1-11.

[6] Michal Irani, and Shmuel Peleg, Improving resolution by image registration, CVGIP:

Graphical Models and Image Processing, 1991, 53(3): 231-239.

[7] Richard A Newcombe, Shahram Izadi, Otmar Hilliges, et al., KinectFusion: real-time dense surface mapping and tracking, 10th IEEE International Symposium on Mixed and Augmented Reality (ISMAR), 2011, 127-136.

[8] YiChang Shih, Sylvain Paris, Connelly Barnes, William T. Freeman, and Fredo Durand, Style transfer for headshot portraits, ACM Transactions on Graphics, 2014, 33(4), 148: 1-14.

What is claimed is:

1. A system for three dimensional (3D) model texturing, wherein the system comprises a computing device and an image capturing device in communication with the computing device, the computing device comprises a processor and a storage device storing computer executable code, and the computer executable code, when executed at the processor, is configured to:
   instruct the image capturing device to capture a plurality of images of an object, wherein the plurality of images comprises m number of keyframes, and m is a positive integer;
   construct a 3D model of the object based on the plurality of images, and define camera poses of the m number of keyframes;
   initially texture the 3D model using the m number of keyframes to obtain an initially textured 3D model;
   generate each of m number of guidance images by projecting the initially textured 3D model to the camera pose of corresponding one of the m number of keyframes; and
   for an i-th guidance image of them number of guidance images and an i-th keyframe of the m number of keyframes: modify the i-th guidance image and the i-th keyframe based on their correspondence to obtain i-th warped image, combine the i-th guidance image and the i-th warped image to obtain i-th harmonized image, and project color from the i-th harmonized image to the 3D model to obtain textured 3D model.

2. The system of claim 1, wherein the computer executable code is configured to construct the 3D model using KinectFusion, and configured to initially texture the 3D model using a blending-based technique.

3. The system of claim 1, wherein the computer executable code is configured to modify the i-th guidance image and the i-th keyframe by:
   searching a pixel in the i-th keyframe for each pixel in the i-th guidance image, and replacing color of the each pixel in the i-th guidance image with color of corresponding one of the pixels in the i-th keyframe to obtain i-th enhanced guidance image; and optimizing dense flow field of the i-th keyframe based on the i-th enhanced guidance image to obtain the i-th warped image.

4. The system of claim 3, wherein the computer executable code is configured to combine the i-th guidance image and the i-th warped image by: performing Laplacian pyramid respectively on the i-th guidance image and the i-th warped image to obtain a six-level i-th guidance pyramid and a six-level i-th keyframe pyramid, and replacing sixth level of the i-th keyframe pyramid with sixth level of the i-th guidance pyramid to obtain the i-th harmonized image.

5. The system of claim 4, wherein the step of searching a pixel in the i-th keyframe is performed by:

blurring the i-th keyframe to obtain an i-th blurred image; and for each target pixel in the i-th guidance image:
defining a guidance patch in the i-th guidance image surrounding the target pixel;
searching a blurred patch in the i-th blurred image that best matches the guidance patch, the blurred patch surrounding a blurred pixel; and
defining a keyframe pixel, wherein coordinates of the keyframe pixel in the i-th keyframe are the same as coordinates of the blurred pixel in the i-th blurred image, and color of the keyframe pixel is used to replace color of the target pixel in the i-th guidance image to obtain the i-th enhanced guidance image.

6. The system of claim 5, wherein size of the targe patch is in a range of 3×3 pixels to 5×5 pixels.

7. The system of claim 6, wherein the step of searching is performed in a search area in the i-th blurred image, size of the search area is in a range of (20-100)×(20-100) pixels, the search area has a central pixel, coordinates of the central pixel in the i-th blurred image are the same as the coordinates of the target pixel in the i-th guidance image.

8. The system of claim 7, wherein the size of the search area is 50×50 pixels.

9. The system of claim 1, wherein the computer executable code is configured to project color from the i-th harmonized image to the 3D model to obtain textured 3D model by, for each triangle face of the 3D model:

determining a number of harmonized keyframes comprising an area corresponding to the triangle face;

determining a normal line of the triangle face passing through a central point of the triangle face;

for each of the number of harmonized keyframes:
connecting the central point of the triangle face and camera center corresponding to the harmonized keyframe to obtain a connecting line;
calculating a direction score $z_1$ by $$z_1 = \frac{90 - \alpha}{90},$$

wherein $\alpha$ is an angle between the normal line and the connecting line;

calculating a distance score based on closest distance d between the area and boundaries in the harmonized keyframe, wherein the distance score is 1 when the closest distance is greater than a pixel threshold Th, and the distance score is $$z_2 = \frac{d}{Th}$$

when the closest distance d equals to or is less than the pixel threshold; and calculating an overall score by weighted summation of the direction score and the distance score; and texturing the triangle face using the one of the number of harmonized keyframes that has the highest overall score.

10. The system of claim 9, wherein the pixel threshold is 50, and the overall score z is calculated by: $z=0.6×z_2+0.4×z_2$.

11. The system of claim 1, further comprising:

a server computing device in communication with the computing device, and configured to store the textured 3D model; and a remote computing device in communication with the server computing device, and configured to, upon receiving an instruction from a customer to fit a product having the textured 3D model: retrieve the textured 3D model, and fit the textured 3D model to the customer at real time.

12. A method for three dimensional (3D) model texturing, comprising:

capturing, by an image capturing device, a plurality of images of an object, and sending the captured plurality of images to a computing device, wherein the plurality of images comprises m number of keyframes, and m is a positive integer;

constructing, by the computing device, a 3D model of the object based on the plurality of images, and defining camera poses of the m number of keyframes;

initially texturing, by the computing device, the 3D model using the m number of keyframes to obtain an initially textured 3D model;

generating, by the computing device, each of m number of guidance images by projecting the initially textured 3D model to the camera pose of corresponding one of the m number of keyframes; and for an i-th guidance image of them number of guidance images and an i-th keyframe of the m number of keyframes: modifying the i-th guidance image and the i-th keyframe based on their correspondence to obtain i-th warped image, combining the i-th guidance image and the i-th warped image to obtain i-th harmonized image, and projecting color from the i-th harmonized image to the 3D model to obtain textured 3D model.

13. The method of claim 12, wherein the step of constructing the 3D model is performed using KinectFusion, and the step of initially texturing the 3D model is performed using a blending-based technique.

14. The method of claim 12, wherein the step of modifying the i-th guidance image and the i-th keyframe and the step of combining the i-th guidance image and the i-th warped image comprise:

searching a pixel in the i-th keyframe for each pixel in the i-th guidance image, and replacing color of the each pixel in the i-th guidance image with color of corresponding one of the pixels in the i-th keyframe to obtain i-th enhanced guidance image;

optimizing dense flow field of the i-th keyframe based on the i-th enhanced guidance image to obtain the i-th warped image; and performing, by the computing device, Laplacian pyramid respectively on the i-th guidance image and the i-th warped image to obtain a six-level i-th guidance pyramid and a six-level i-th keyframe pyramid, and replacing sixth level of the i-th keyframe pyramid with sixth level of the i-th guidance pyramid to obtain the i-th harmonized image.

15. The method of claim 14, wherein the step of searching a pixel in the i-th keyframe comprises:
blurring the i-th keyframe to obtain an i-th blurred image; and
for each target pixel in the i-th guidance image:
defining a guidance patch in the i-th guidance image surrounding the target pixel;
searching a blurred patch in the i-th blurred image that best matches the guidance patch, the blurred patch surrounding a blurred pixel; and
defining a keyframe pixel, wherein coordinates of the keyframe pixel in the i-th keyframe are the same as coordinates of the blurred pixel in the i-th blurred image, and color of the keyframe pixel is used to replace color of the target pixel in the i-th guidance image to obtain the i-th enhanced guidance image.

16. The method of claim 15, wherein size of the targe patch is in a range of 3×3 pixels to 5×5 pixels, and the step of searching is performed in a search area in the i-th blurred image, size of the search area is in a range of (20-100)×(20-100) pixels, the search area has a central pixel, coordinates of the central pixel in the i-th blurred image are the same as the coordinates of the target pixel in the i-th guidance image.

17. The method of claim 12, wherein the step of projecting color from the i-th harmonized image to the 3D model to obtain textured 3D model comprises, for each triangle face of the 3D model:
determining a number of harmonized keyframes comprising an area corresponding to the triangle face;
determining a normal line of the triangle face passing through a central point of the triangle face;
for each of the number of harmonized keyframes:
connecting the central point of the triangle face and camera center corresponding to the harmonized keyframe to obtain a connecting line;
calculating a direction score $z_1$ by $$z_1 = \frac{90 - \alpha}{90},$$

wherein $\alpha$ is an angle between the normal line and the connecting line;
calculating a distance score based on closest distance d between the area and boundaries in the harmonized keyframe, wherein the distance score is 1 when the closest distance is greater than a pixel threshold Th, and the distance score is $$z_2 = \frac{d}{Th}$$

when the closest distance d equals to or is less than the pixel threshold; and
calculating an overall score by weighted summation of the direction score and the distance score; and
texturing the triangle face using the one of the number of harmonized keyframes that has the highest overall score.

18. The method of claim 17, wherein the pixel threshold pixels is 50, and the overall score z is calculated by: $z=0.6 \times z_2 + 0.4 \times z_2$.

19. The method of claim 12, further comprising:
storing the textured 3D model to a server computing device in communication with the computing device; and
upon receiving an instruction from a customer, at a remote computing device in communication with the server computing device, to fit a product having the textured 3D model: retrieving the textured 3D model, and fitting the textured 3D model to the customer at real time.

20. A non-transitory computer readable medium storing computer executable code, wherein the computer executable code, when executed at a processor of a computing device, is configured to:
instruct an image capturing device to capture a plurality of images of an object, wherein the plurality of images comprises m number of keyframes, and m is a positive integer;
construct a 3D model of the object based on the plurality of images, and define camera poses of the m number of keyframes;
initially texture the 3D model using the m number of keyframes to obtain an initially textured 3D model;
generate each of m number of guidance images by projecting the initially textured 3D model to the camera pose of corresponding one of the m number of keyframes; and
for an i-th guidance image of them number of guidance images and an i-th keyframe of the m number of keyframes: modify the i-th guidance image and the i-th keyframe based on their correspondence to obtain i-th warped image, combine the i-th guidance image and the i-th warped image to obtain i-th harmonized image, and project color from the i-th harmonized image to the 3D model to obtain textured 3D model.

* * * * *